Oct. 13, 1942.  R. W. RITZERT  2,298,416
CARD VERIFIER
Filed Feb. 10, 1939   25 Sheets-Sheet 1

INVENTOR
R.W. RITZERT
BY *H. A. Sparks*
ATTORNEY

Oct. 13, 1942.
R. W. RITZERT
2,298,416
CARD VERIFIER
Filed Feb. 10, 1939
25 Sheets-Sheet 2
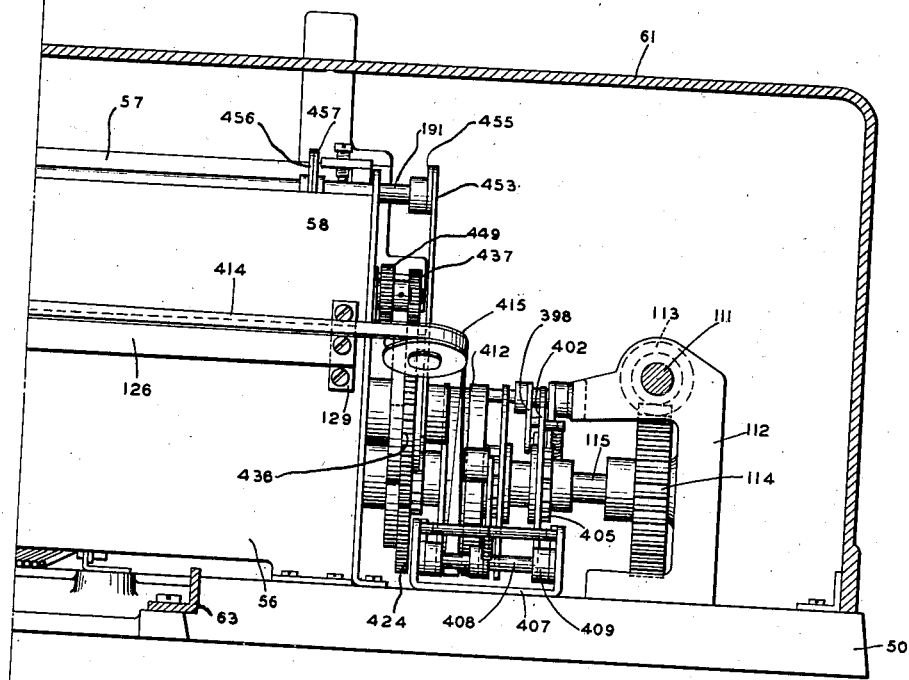
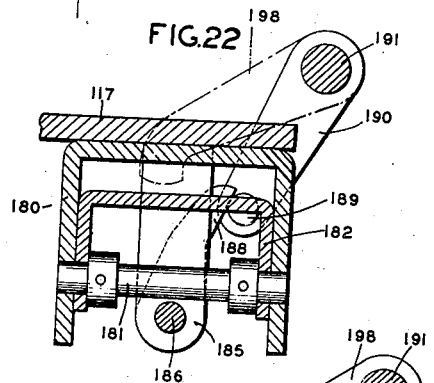
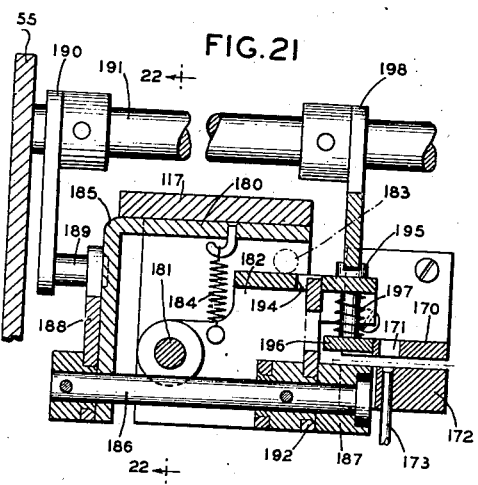
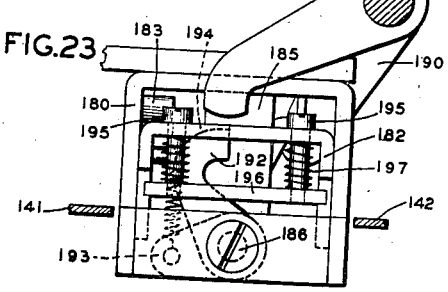
INVENTOR
R. W. RITZERT
BY *W. A. Spark*
ATTORNEY

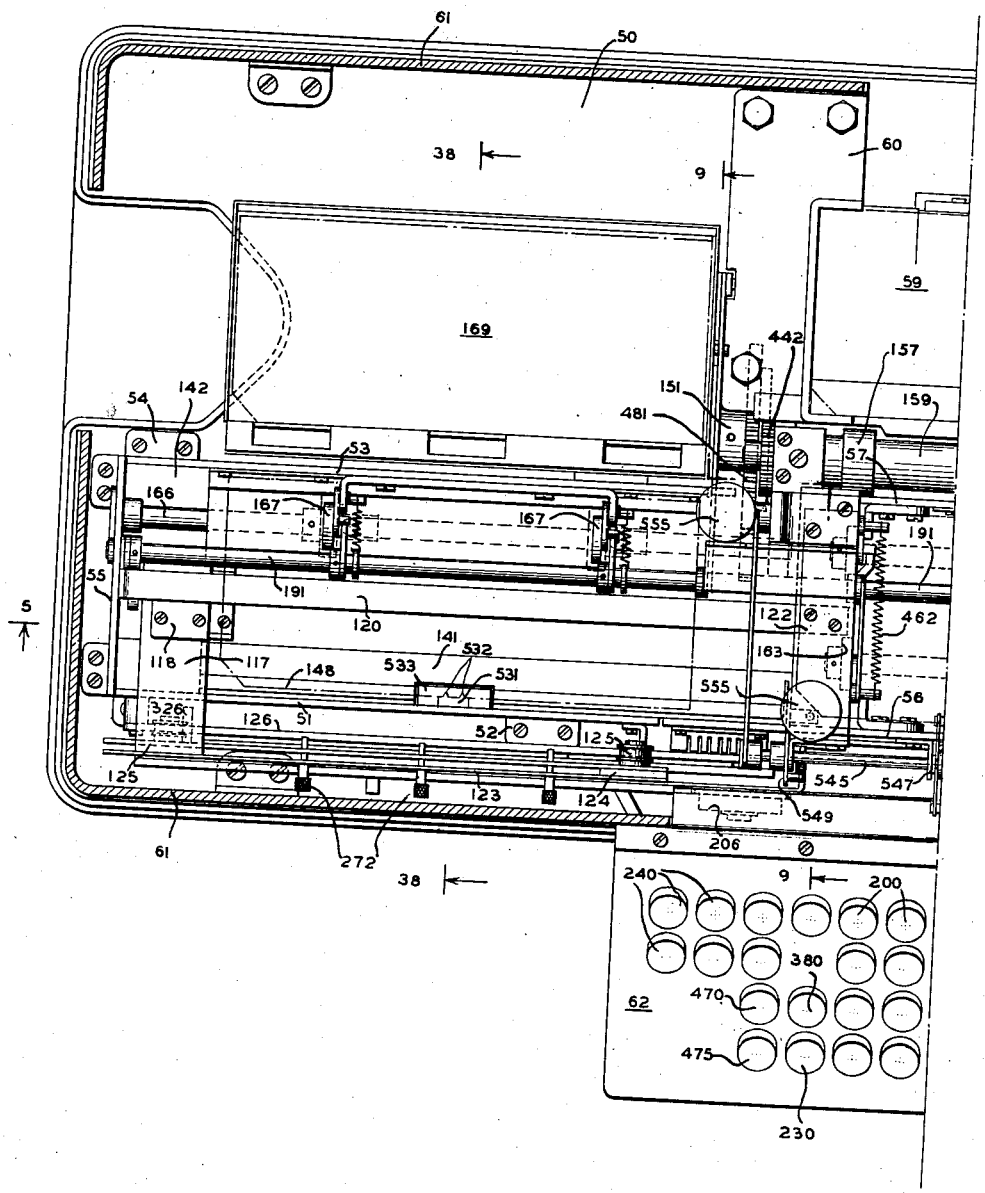

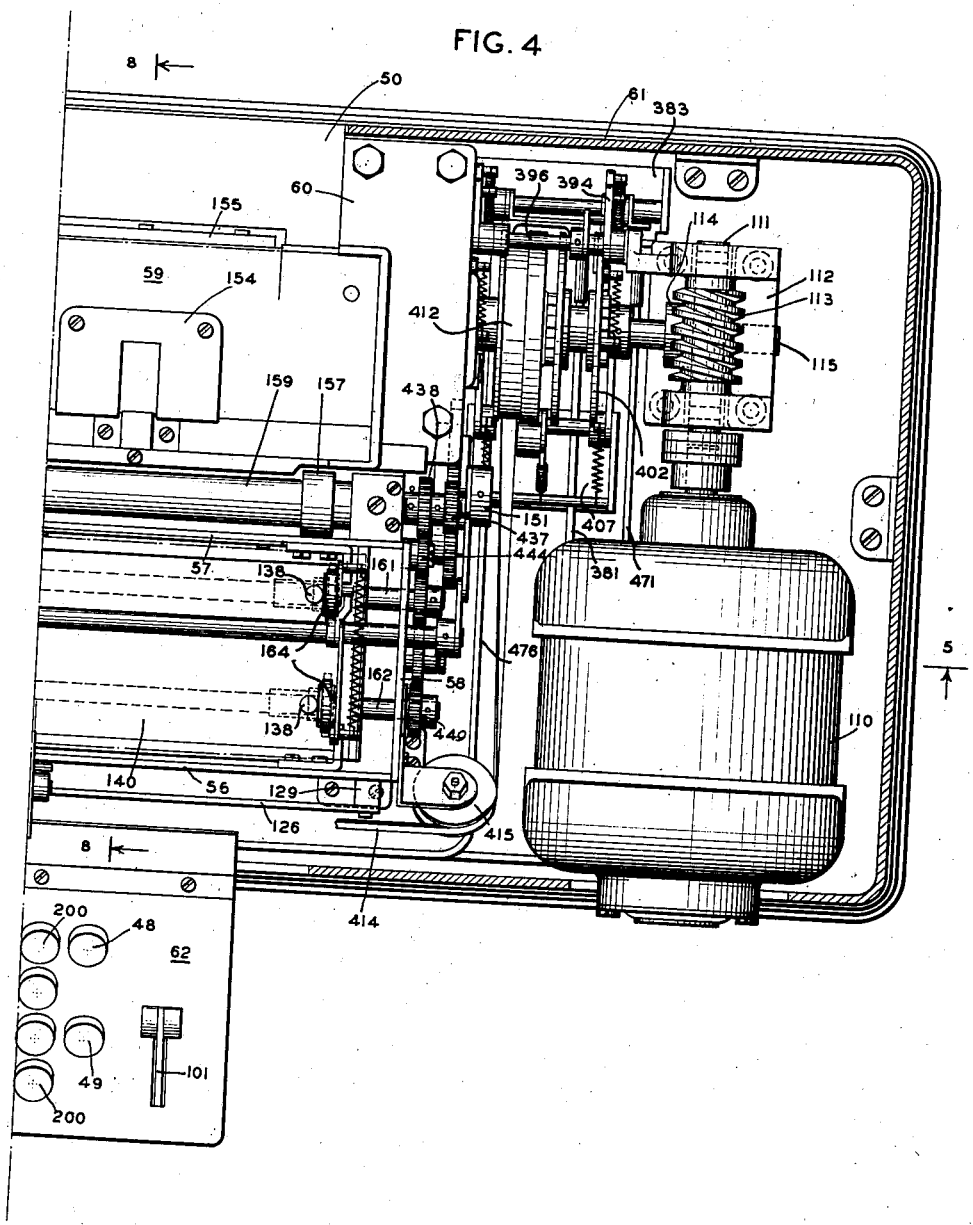

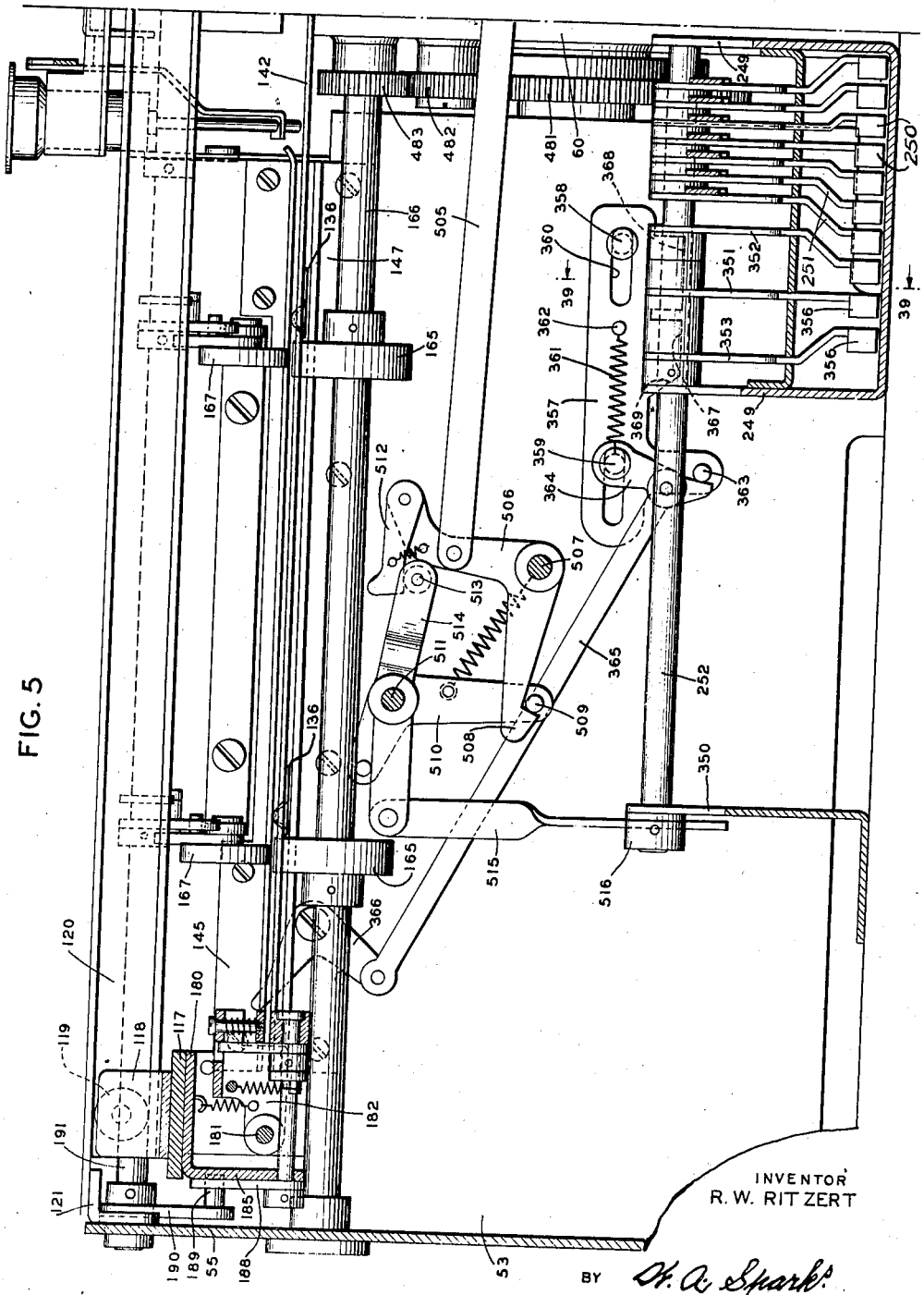

Oct. 13, 1942.                    R. W. RITZERT                    2,298,416
                                   CARD VERIFIER
                                Filed Feb. 10, 1939            25 Sheets-Sheet 6

FIG. 6

INVENTOR
R. W. RITZERT
BY H. A. Sparks
ATTORNEY

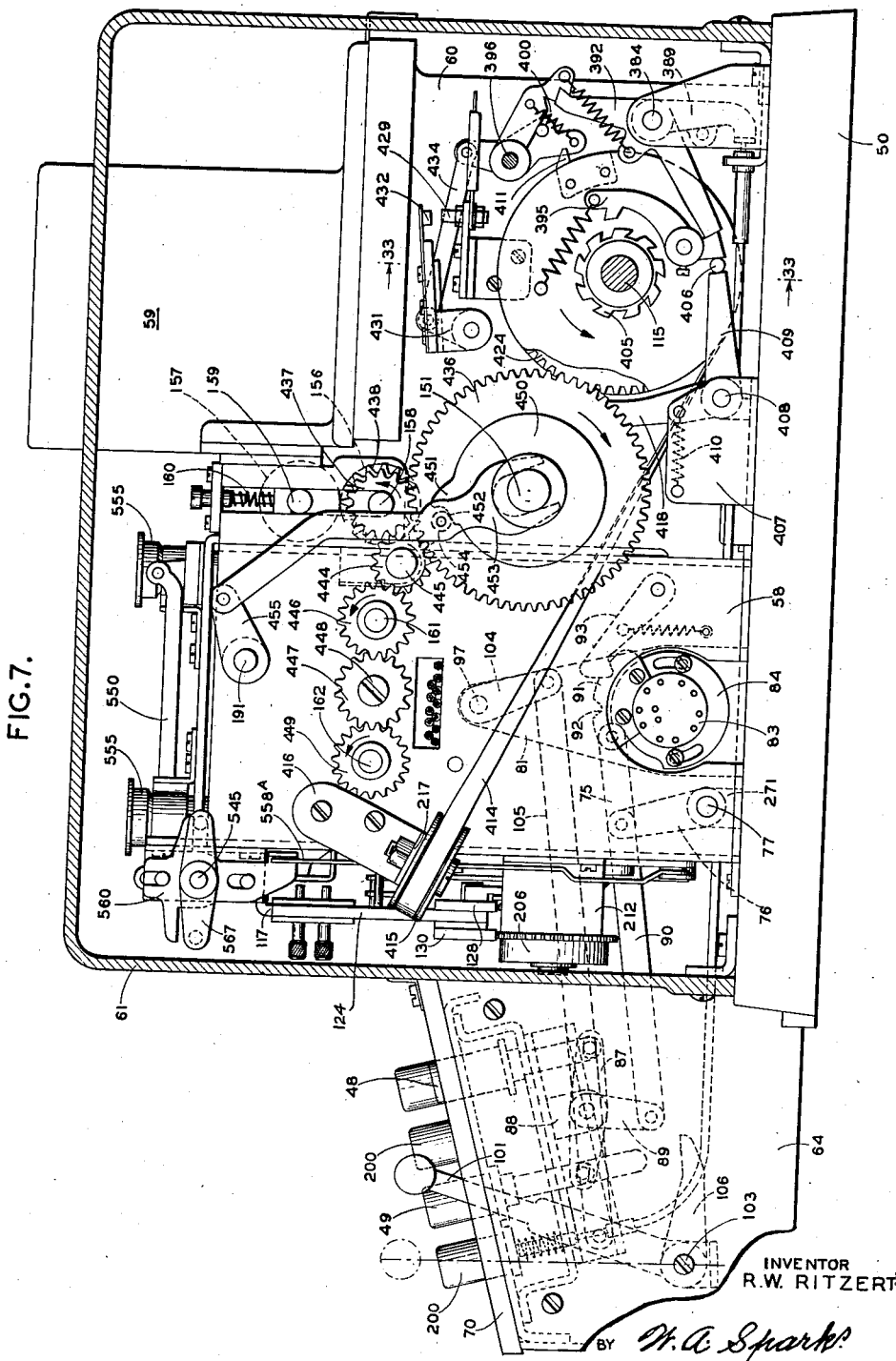

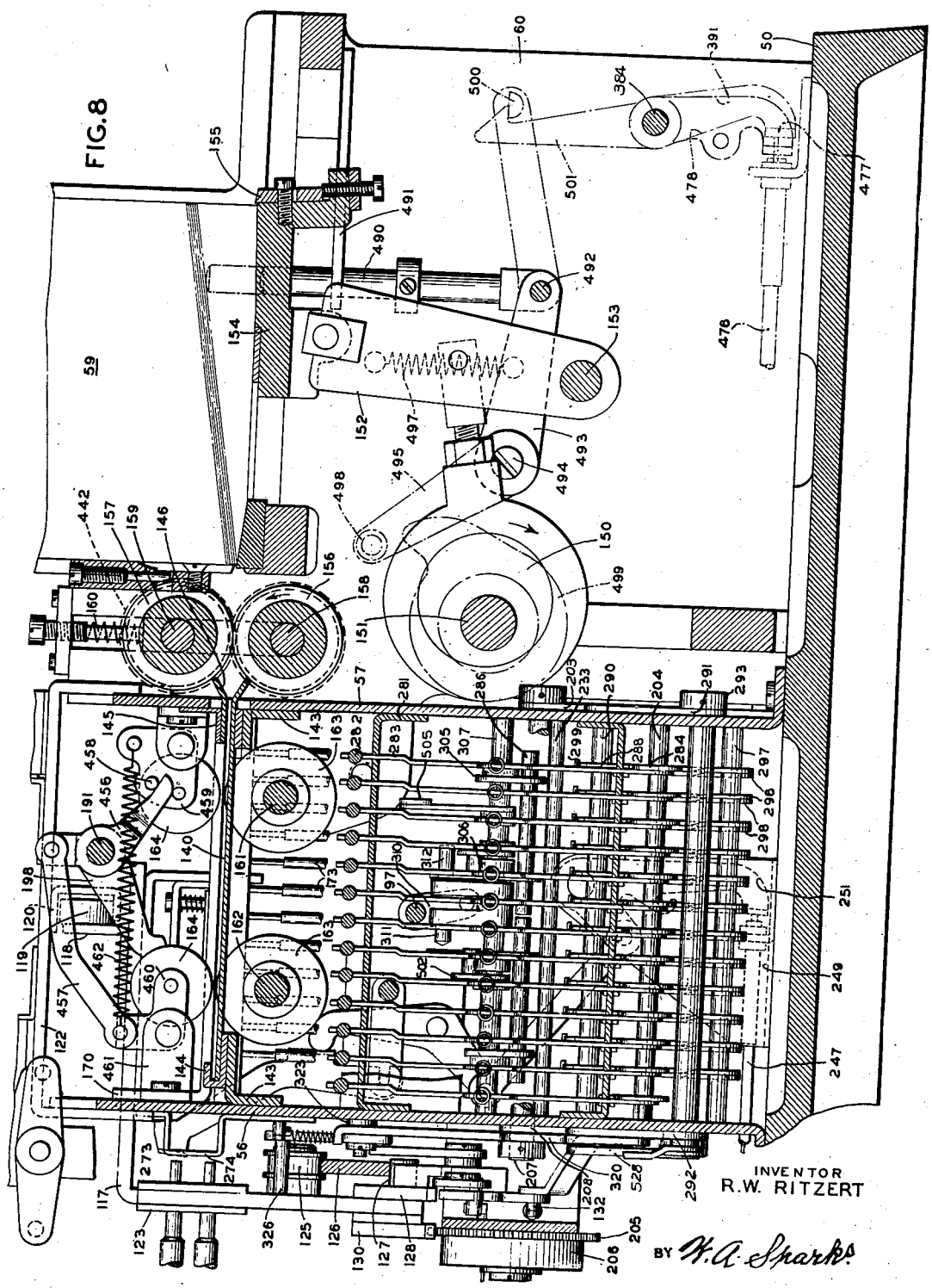

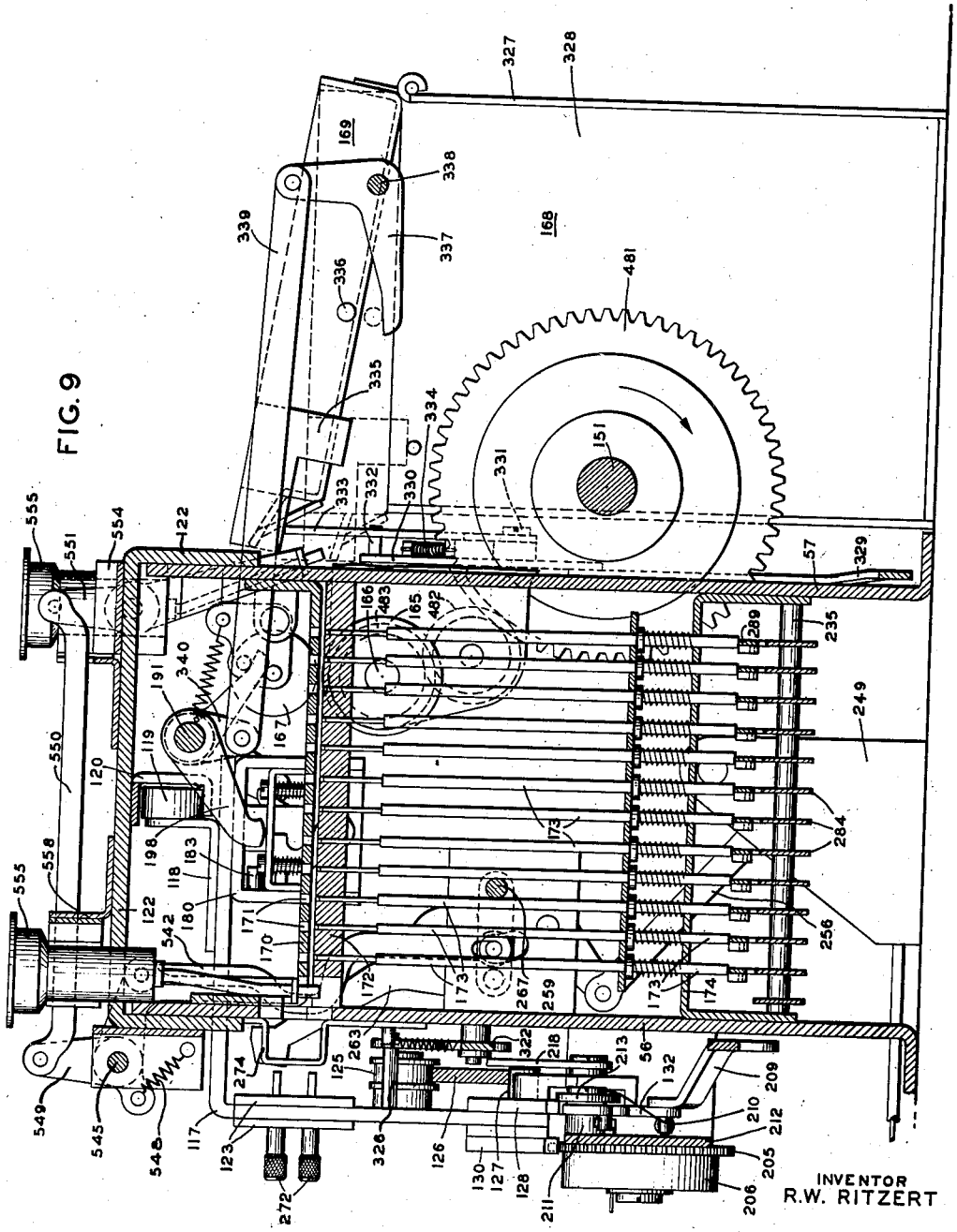

Oct. 13, 1942.                R. W. RITZERT                2,298,416
                                CARD VERIFIER
                             Filed Feb. 10, 1939            25 Sheets—Sheet 10

INVENTOR
R. W. RITZERT
BY *H. A. Spark*
ATTORNEY

Oct. 13, 1942.    R. W. RITZERT    2,298,416
CARD VERIFIER
Filed Feb. 10, 1939    25 Sheets-Sheet 11

INVENTOR
R. W. RITZERT
BY *W. A. Sparks*
ATTORNEY

Oct. 13, 1942.          R. W. RITZERT          2,298,416
                         CARD VERIFIER
                      Filed Feb. 10, 1939         25 Sheets-Sheet 12

INVENTOR
R.W. RITZERT
BY H. A. Sparks
ATTORNEY

Oct. 13, 1942.  R. W. RITZERT  2,298,416
CARD VERIFIER
Filed Feb. 10, 1939  25 Sheets-Sheet 13

INVENTOR
R. W. RITZERT
BY *H. G. Sparks*
ATTORNEY

Oct. 13, 1942.  R. W. RITZERT  2,298,416
CARD VERIFIER
Filed Feb. 10, 1939  25 Sheets-Sheet 14

INVENTOR
R. W. RITZERT
BY *H. C. Sparks*
ATTORNEY

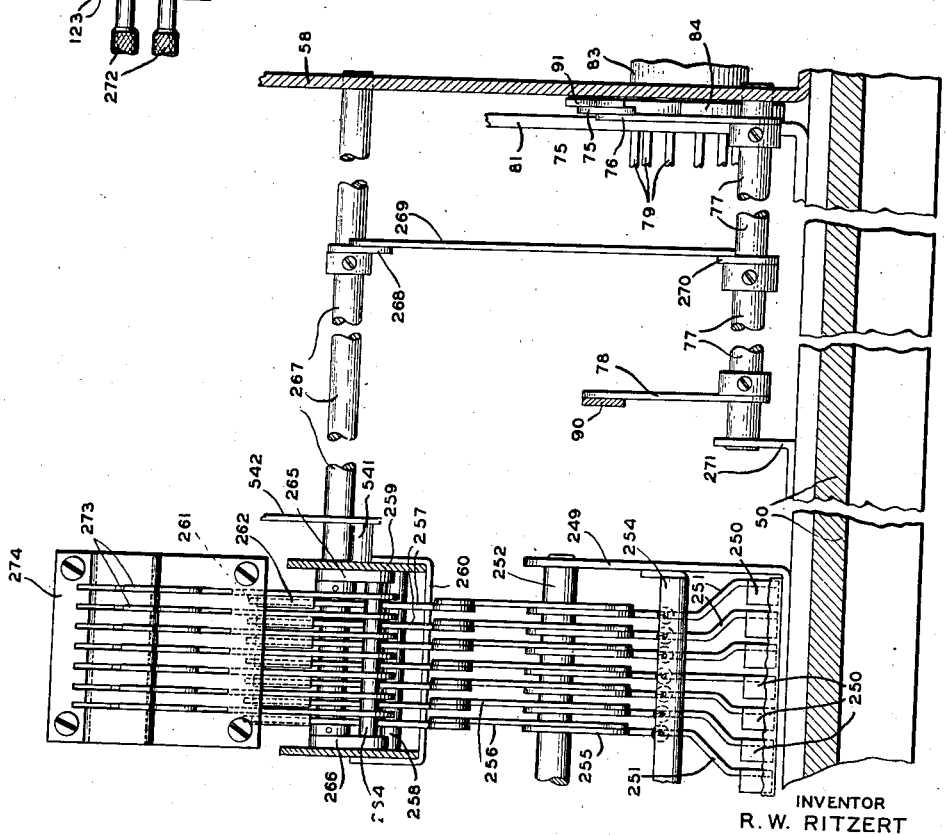

Oct. 13, 1942.

R. W. RITZERT 2,298,416

CARD VERIFIER

Filed Feb. 10, 1939

INVENTOR
R. W. RITZERT

BY *H. A. Sparks*
ATTORNEY

Oct. 13, 1942.　　　　R. W. RITZERT　　　　2,298,416
CARD VERIFIER
Filed Feb. 10, 1939　　　25 Sheets-Sheet 17

INVENTOR
R. W. RITZERT
BY *H. C. Spark*
ATTORNEY

Oct. 13, 1942.　　　R. W. RITZERT　　　2,298,416
CARD VERIFIER
Filed Feb. 10, 1939　　　25 Sheets-Sheet 18

INVENTOR
R. W. RITZERT
BY *W. A. Sparks*
ATTORNEY

Oct. 13, 1942.  R. W. RITZERT  2,298,416
CARD VERIFIER
Filed Feb. 10, 1939  25 Sheets-Sheet 19

INVENTOR
R.W. RITZERT

BY *W. A. Spark*
ATTORNEY

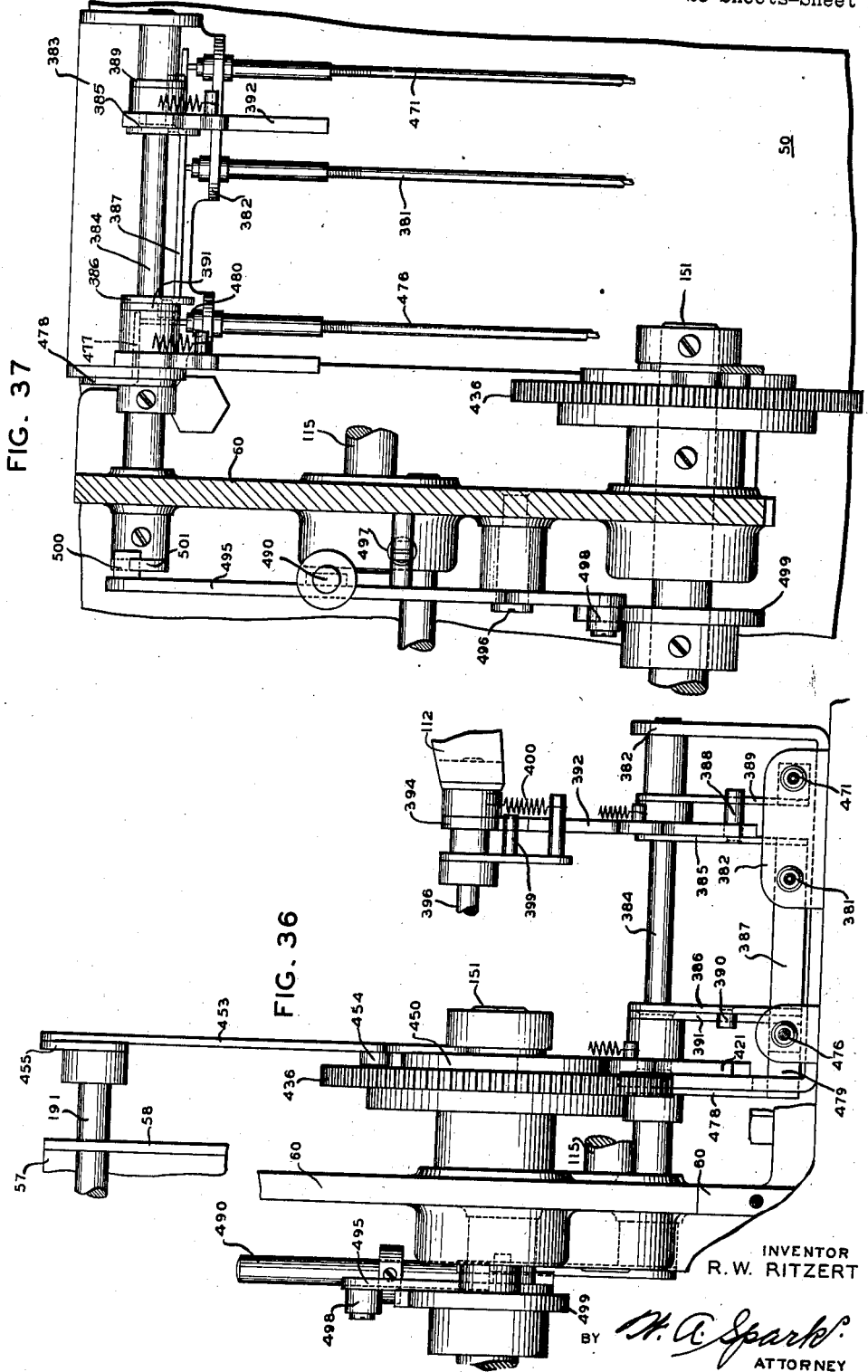

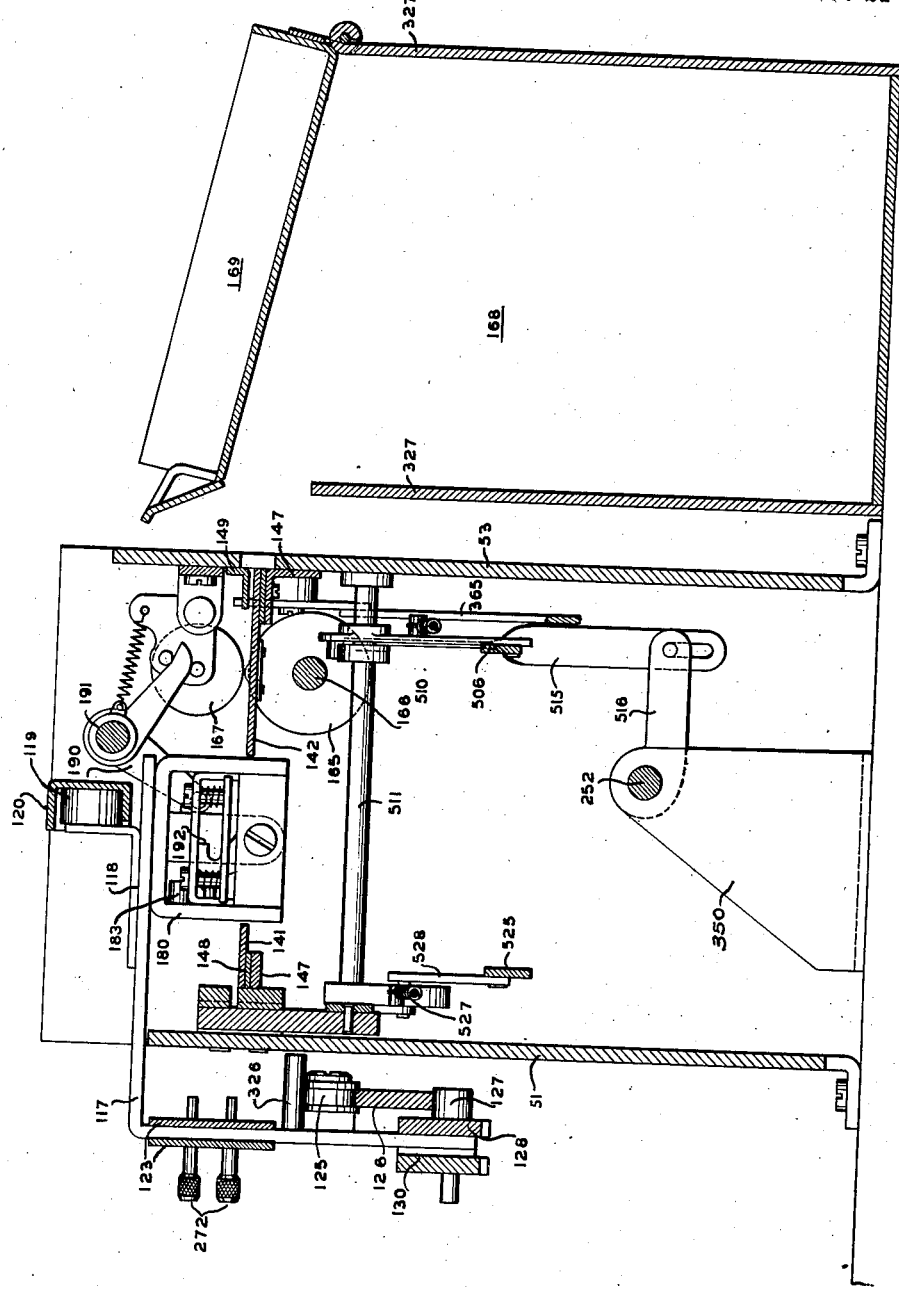

Oct. 13, 1942.

R. W. RITZERT 2,298,416

CARD VERIFIER

Filed Feb. 10, 1939

INVENTOR
R. W. RITZERT

BY *W. A. Spark*

ATTORNEY

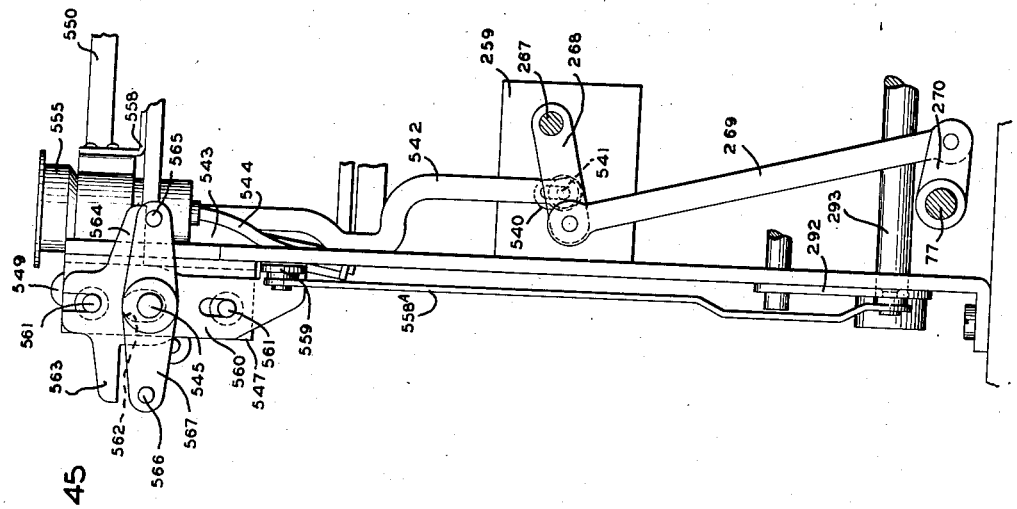
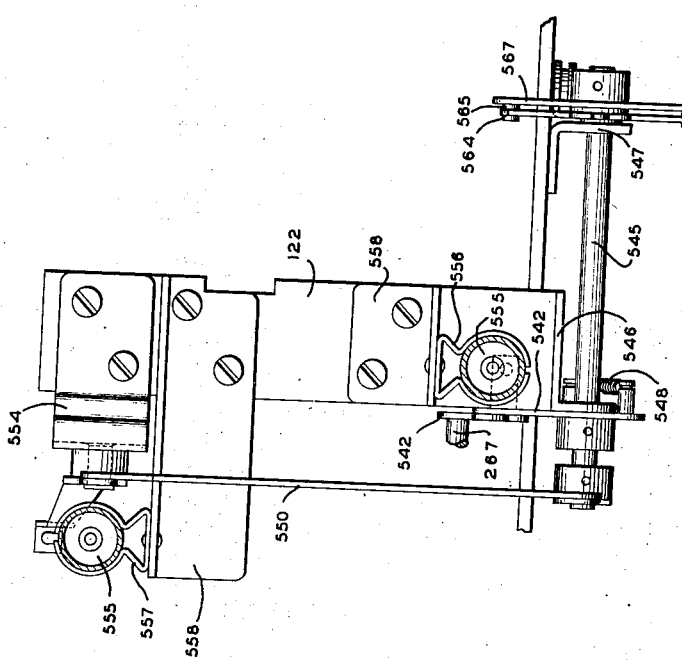

Oct. 13, 1942.      R. W. RITZERT      2,298,416
CARD VERIFIER
Filed Feb. 10, 1939      25 Sheets-Sheet 24
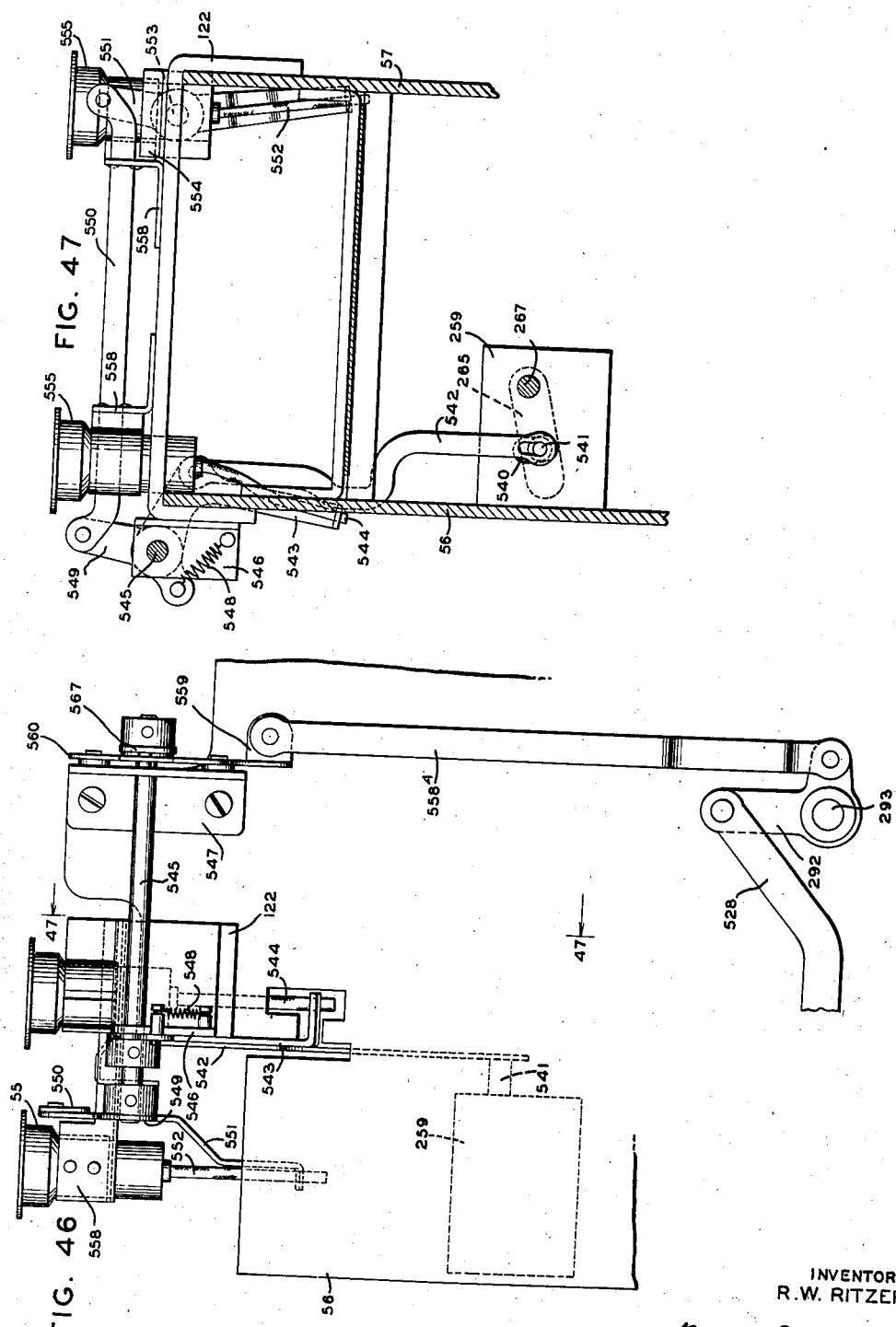
INVENTOR
R.W. RITZERT
BY H. A. Sparks
ATTORNEY Patented Oct. 13, 1942

2,298,416

UNITED STATES PATENT OFFICE 2,298,416

CARD VERIFIER

Robert W. Ritzert, Brooklyn, N. Y., assignor to Remington Rand Inc., Buffalo, N. Y., a corporation of Delaware Application February 10, 1939, Serial No. 255,706

20 Claims. (Cl. 73—54)

This invention relates to mechanism for verifying the data on perforated cards for use in business accounting machines.

Heretofore verifiers of this type have been hand-fed and are adapted to stop the carriage when an error is found. The card is then either withdrawn manually or the verification completed and then ejected.

Also, many different methods of marking the point of error in the card have been used, such as punching a hole in the card contiguous to the error column or marking on the face or back thereof with a stylus or wick.

It is, therefore, the principal object of this invention, to provide a verifying mechanism which will eject the card immediately upon finding the first error.

A further object is to provide a means for mutilating the card so that it cannot be used in a business machine having a restricted throat.

Another object is to provide a means for marking the edges of cards which have been verified.

Still another object is to provide means for disabling the edge marking device at the point where an error is found.

A further object is to provide storage pockets into which the verified and incorrect cards may be sorted.

A still further object is to provide a translating means whereby cards perforated in either of two codes may be verified.

Another object is to provide means for preventing the carriage, after a card has been gripped therein, from being returned until a full travel has been made by the carriage.

The machine is automatic in the sense that the card is entirely out of the control of the operator while being verified. In other words, the cards are placed in a magazine from which they are fed into a travelling carriage which carries the card through a sensing mechanism. The cards are verified column by column by means of a manually operated keyboard which controls the verifying mechanism. If the perforations correspond to the sensing pins controlled by the keyboard, the escapement mechanism permits the carriage to step one column to the left.

The carriage, when in its normal position, is at the extreme left of the machine. Upon operation of a trip key the motor is started and a clutch is operated to start the carriage toward the extreme right where a card is fed in at right angles to the travel of the carriage. Immediately, the card is in place the card gripper grips the card and the machine is then in condition to permit the keys to be operated to verify the card. Upon operation of a key corresponding to the perforations sensed, the escapement operates and permits the carriage to step to the left. If, however, the key operated does not correspond to the perforations, the carriage will not step, but will automatically be released, and will then travel to the extreme left of the machine. An eject key will then be manually operated and will then cause the card gripper to release the card and permit the eject rolls to carry the card to the eject pocket.

In verifying 90-column cards, the upper zone is sensed first and then the carriage return key is operated, which restores the carriage to the extreme right-hand position. The translating mechanism is then positioned and the lower zone verified.

Ink wicks are provided which mark the edges of verified cards and are withdrawn immediately an error is found. Cards containing errors are mutilated so that they cannot be fed through a machine having a restricted throat.

A more clear conception of the operation, construction, and further objects of the invention may be had from the following detailed description, when read in conjunction with the accompanying drawings, in which:

Figs. 1 and 2, combined, form a front elevation of the machine with the keyboard removed, disclosing the card carriage, escapement, mutilating punch, main drive, and carriage return mechanisms;

Figs. 3 and 4, combined, form a top plan view of the machine, disclosing the card magazine and eject pockets, card carriage, ink wicks, punch keyboard, motor, and main drive and associated control mechanisms;

Figs. 5 and 6, combined, form a cross sectional view taken along line 5—5 of Figs. 3 and 4, disclosing the card gripper control key, interlock sensing and verifying mechanism, and translating unit;

Fig. 7 is an elevation of he right-hand side of the machine taken just inside the cover disclosing the keyboard translating unit, carriage return mechanism, and associated mechanisms;

Fig. 8 is a section taken substantially along the line 8—8 of Fig. 4, showing the card feed and associated disabling device, the verifying and escapement mechanisms;

Fig. 9 is a section taken substantially along line 9—9 of Fig. 3, showing the card carriage, eject rolls, card pockets, sensing pins, and the inking wick;

Fig. 21 is an enlarged front sectional view of the card gripper;

Fig. 22 is a cross sectional view taken along line 22—22 of Fig. 21;

Fig. 23 is a right-hand side elevation of the card gripper;

Fig. 26 is a detail view, partly in section, of the tabulating mechanism;

Fig. 27 is a side elevation of the mechanism shown in Fig. 26;

Fig. 36 is an enlarged front detail view of the connections and operating arms actuated by the control keys;

Fig. 37 is a top plan view of the mechanism shown in Fig. 36;

Fig. 38 is a cross section through the machine along line 38—38 of Fig. 3;

Fig. 44 is a plan view of the card marking mechanism;

Fig. 45 is a right-hand side elevation of the mechanism shown in Fig. 44;

Fig. 46 is a front elevation of the same;

Fig. 47 is a cross sectional view taken along line 47—47 of Fig. 46;

Machine frames

Figure 1:
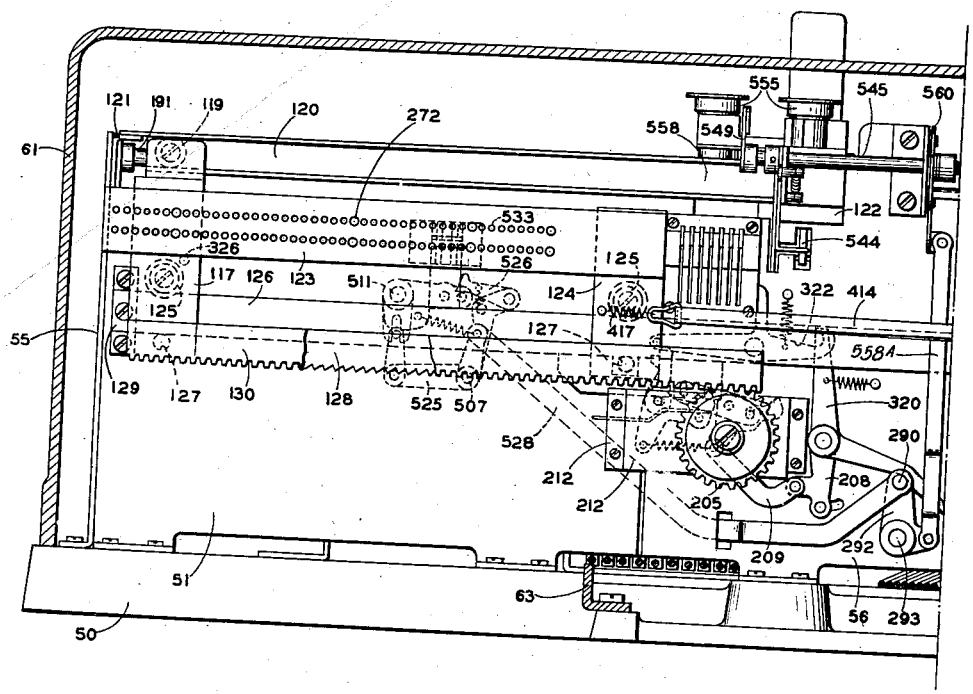

Referring particularly to Figs. 3 and 4, a main base plate 50 supports the entire framework of the machine. Mounted upon the base plate 50 are two units of framework containing the card handling mechanism, each unit consisting of three upright walls. On the left-hand side of the machine and near the front is mounted a unit, comprising a vertical wall 51 (Fig. 3) fastened to the base 50 by a pair of bent-off lugs 52 which are formed integral therewith. Fastened to the base 50 and directly behind wall 51 is a frame wall 53 which runs parallel to 51 and is secured to the base by lugs 54. Joining the left ends of the walls 51 and 53 is a vertical wall 55, which is fastened to the base in the same manner as the front and rear walls. The wall 55, together with the frames 51 and 53, forms a box-like enclosure having the top and right-hand end open.

The other frame unit consists of front and rear walls 56 and 57 (Fig. 4) and end wall 58. This unit also forms a box-like structure, but it has the top and left-hand end open.

Figure 33:
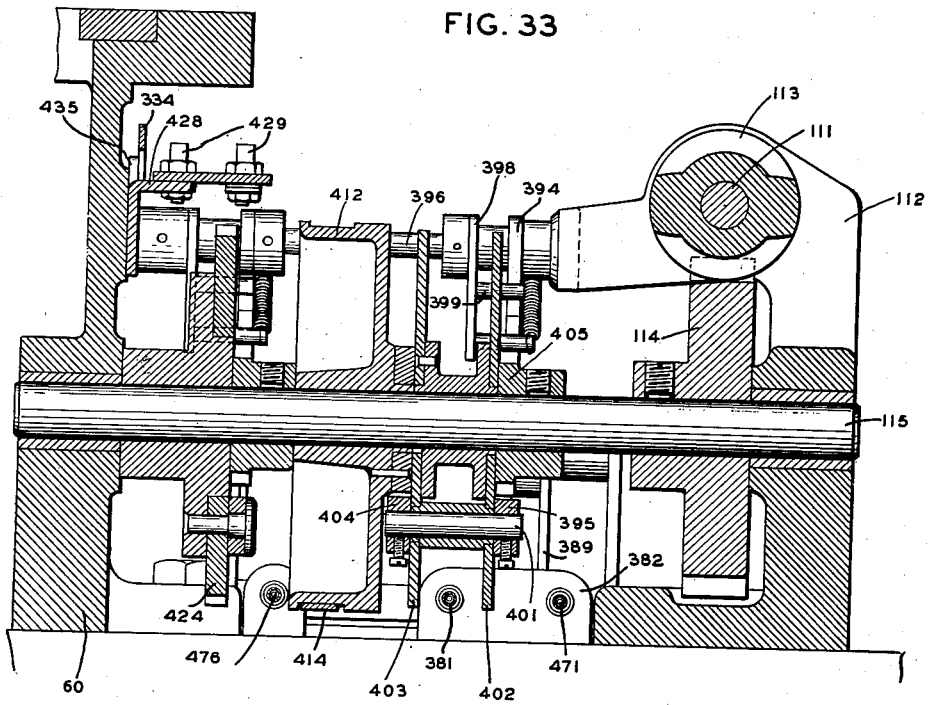
Fig. 33 is a cross section of the connections between the motor shaft and clutch mechanisms taken substantially along the line 33—33 of Fig. 7.
Figure 34:
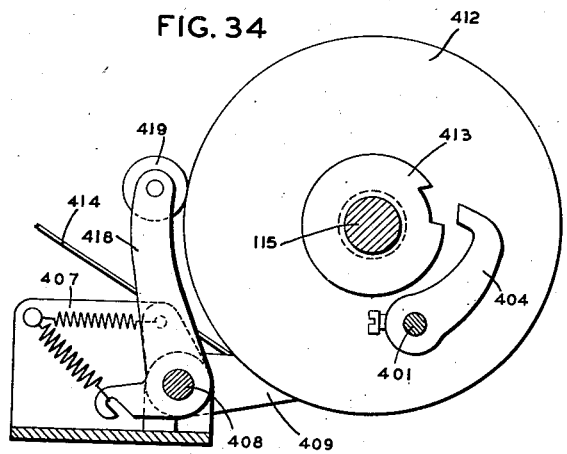
Fig. 34 is a detail view disclosing the carriage return drum and its associated clutch and brake mechanisms.
Figure 35:
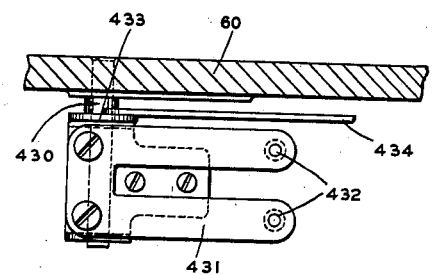
Fig. 35 is a top plan view of the motor contacts.
Figure 39:
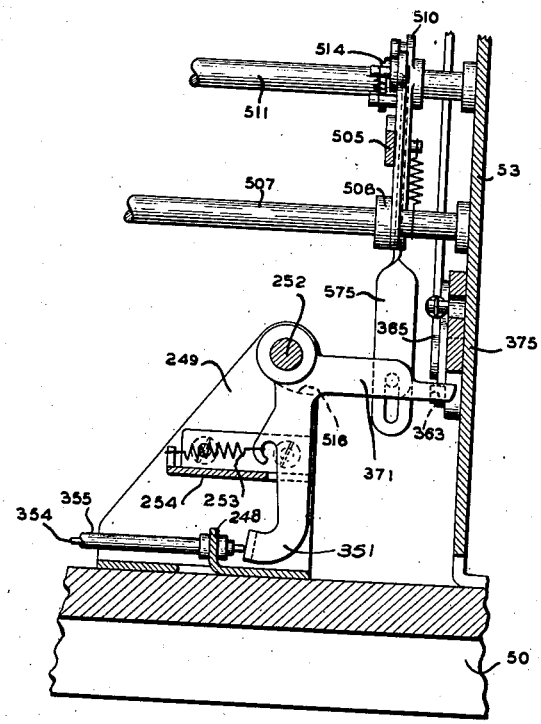
Fig. 39 is a detail cross section of the control key interlock taken along line 39—39 of Fig. 5.

A card magazine or hopper 59 of the usual Powers construction is mounted upon two upright frame walls 60 which are suitably secured to the base casting 50. These walls 60 are best shown in Figs. 7, 8, and 33, but, as they are of old and well known construction, they will not be described herein.

The mechanism of the machine is enclosed in a removable cover 61. The keys are carried in a keyboard which generally speaking is hung on the base plate 50 immediately in front of and at the center of the cover 61.

Keyboard

Referring to Figs. 3, 4, 10, 11, and 13 a keyboard structure of the machine is generally designated by the numeral 62 and is adapted to support a plurality of keys, the operations of which will hereinafter be described. The keyboard extends forwardly from the front of the cover and is positioned midway between the sides of the machine, and is supported upon two forwardly extending L-shaped brackets 63 (Figs. 11 and 13), which are suitably secured to the base 50 of the machine. Secured to the brackets 63 by screws are two side frames 64 which are held together by tie rods 65. The side frames 64 are provided with inwardly extending flanges 66 on which is secured a U-shaped plate 67 having openings in which a plurality of key-heads are positioned. Secured to the forward side of the plate 67 is an L-shaped front and base cover plate 68 which extends downwardly and rearwardly and is secured to the lower flanges of frames 64. An angle bracket 69 serves to strengthen the lower corner of the cover 68. Secured to the top of the plate 67 is a cover plate 70 of hard rubber or other suitable material. Secured to the underside of the plate 67 is bracket 71 in which the lower ends of the stems 72 of the keys are positioned. A bracket 73 secured below the bracket 71 provides an anchor plate for one end of the cover of Bowden wires 74, one of which is positioned beneath each of the stems 72 of the keys in the keyboard.

All of the operations of the machine are controlled from the keyboard which contains the numeral keys from "one" to "nine," "zero," "eleven," and "twelve." Seven tabulator keys are provided, together with control keys for "Trip," "Eject," "Carriage return," and "Space." There is also provided a pair of keys, one designated "Upper" and the other "Lower" and a lever for controlling a decoding unit to be described hereinafter.

Translating unit

The keys of the keyboard are connected to the operating mechanism of the machine by the Bowden wires 74 and in the case of the numeral keys these wires pass through a decoding or translating unit which is controlled from the keyboard.

In the present machine, which is for verifying cards used in Powers type of machines, there are two codes used, one the 45-column or single hole code and the other the 90-column or two-hole code. The 45-column code is used in 45-column cards in which there are twelve indicator positions each representing a digit. In the 90-column card the field is divided into two zones, an upper zone of 45-columns and a lower zone of the same number. In this type of a card a two-hole code is used in which there are six indicator positions representing the digits "one," "three," "five," "seven," and "nine," the even numbers being represented by a combination of the next lower odd number perforation and the "nine" perforation, i. e., "one" and "nine" represent "two."

Figure 14:
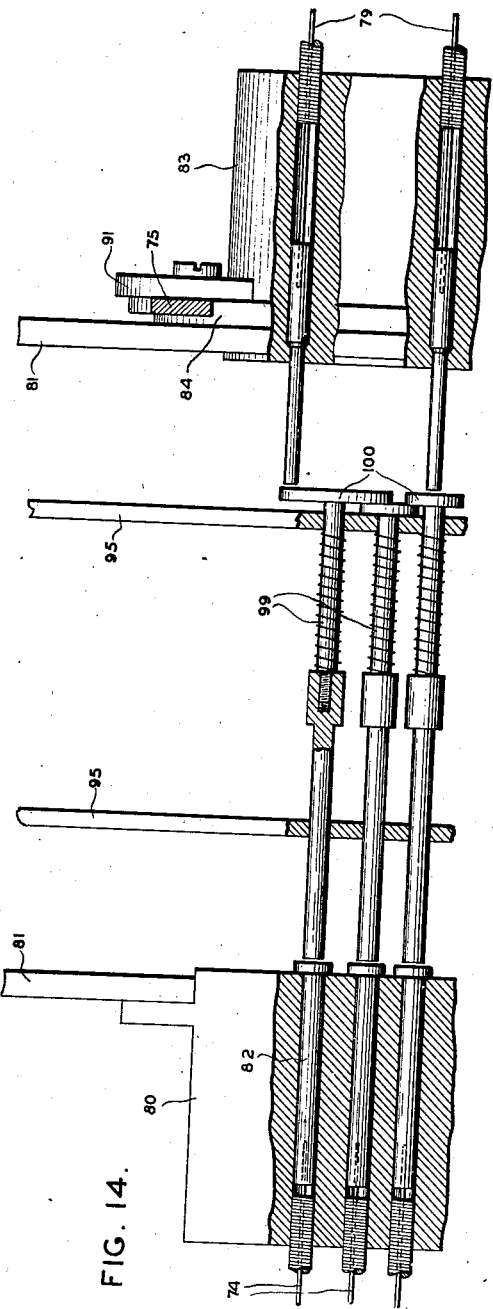
Fig. 14 is an enlarged detail view, partly in section, of the translator unit.

In order that one set of keys may be used for verifying the above codes, a decoder or translator is provided in which the Bowden wires 74 from the keys may be selectively connected with those extending to the sensing mechanism. The Bowden wires terminate in a cylindrical block 80 which is mounted in a U-shaped frame 81. As is shown in Fig. 14 a flat headed plunger 82 is associated with each Bowden wire 74 and slidably mounted in the block 80. There are twelve of the above plungers, each controlled by a numeral key and positioned to cooperate with members in a swinging frame.

The Bowden wires 79, connected to the sensing mechanism, are anchored in a second cylindrical block 83, which is rotatably secured to the frame 81 by a flange 84 having a pair of slots 85 formed therein cooperating with pins 86 in the frame.

Figure 17:
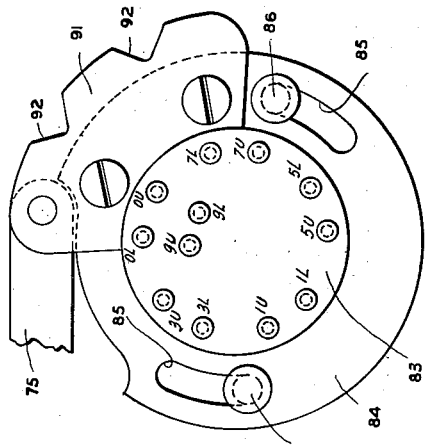
Fig. 17 is a detail view similar to Fig. 16 with the parts in the lower 90-column code position.
Figure 16:
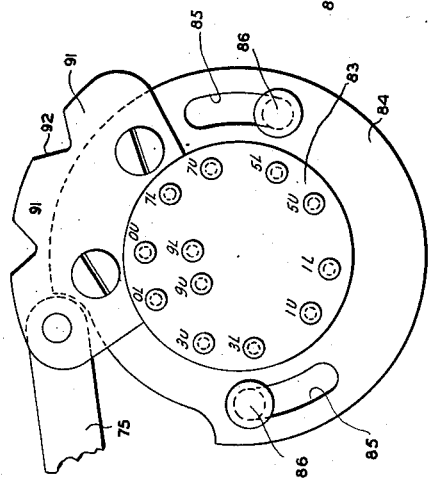
Fig. 16 is a detail view of the variable portion of the translator set in the upper 90-column and 45-column code position.
Figure 15:
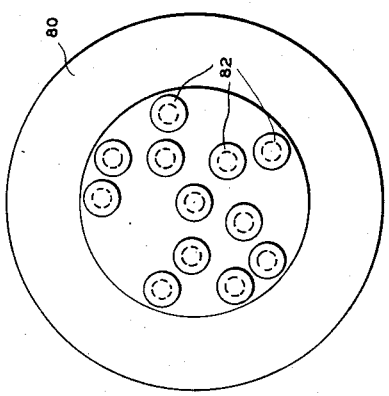
Fig. 15 is a detail view of the keyboard end of the translator unit.

The block 83 is adapted to be rotated into either one or two positions by the "upper" key 48 or "lower" key 49. The lower ends of the shanks of these keys are connected to each end of a bellcrank 87 (Figs. 7 and 11) pivoted at its center to a bracket 88. Formed integral with the bell-crank 87 is an arm 89 which is connected to one end of a rearwardly extending link 90, the other end being connected to an upright arm 78 secured to a shaft 77. The shaft 77 is mounted at the right end (Fig. 26) in the end frame 58 and at the left end in a right angle bracket 271 secured to the base. Also secured to the shaft 77 is a second arm 76 which is connected by a link 75 to a plate 91 secured to the flange 84 of the cylindrical block 83. The plate 91 is formed with a pair of notches 92 adapted to cooperate with a spring-urged latch 93. When the "upper" key 48 is operated the block 83 is rotated counter-clockwise to the position shown in Fig. 16, and, if the "lower" key 49 is operated, the block is rotated clockwise to the position of Fig. 17.

Figure 19:
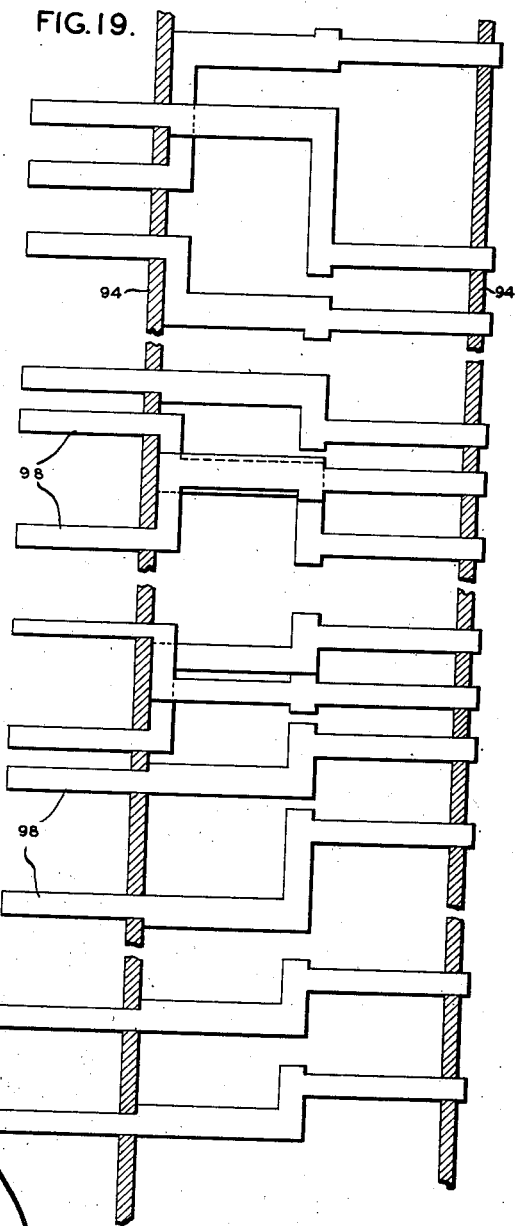
Fig. 19 is a developed view of the 45-column interponents.
Figure 18:
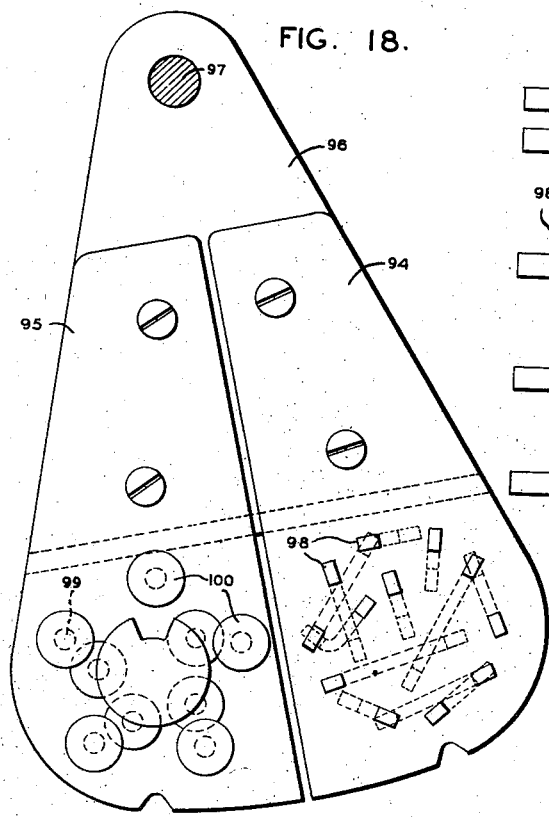
Fig. 18 is a detail view of the swinging frame of the translator mechanism.

Positioned between the blocks 80 and 83 is a swinging frame comprising two pairs of plates 94 and 95 which are secured to a U-shaped member 96 which is, in turn, secured to the shaft 97. The shaft 97 is mounted at the left in a bracket 48 and at the right in the upstanding arms of the U-shaped bracket 81. The plates 94 and 95 are formed as shown in Fig. 18, and are provided with holes therein to accommodate a plurality of plungers, one set being formed of rods 99 each having a circular head 100 thereon and the other set being formed of flat bars 98 shaped as shown in Fig. 19. These two sets of plungers form the nucleus of the translator mechanism in that, with the frame in one position, the flat bars permit the machine to verify cards perforated in 45-column code, while with the other set in position, it may verify 90-column codes. To permit verifying 45-column cards, the frame is moved toward the front of the machine, thus positioning bars 98 in line between the Bowden wires 74 (Fig. 14) and Bowden wires 79.

To permit the verifying of 90-column cards the frame is swung toward the rear of the machine thus positioning the rods 99 in line with the Bowden wires 79. The heads 100 of the rods 99 are adapted to cooperate with the Bowden wires 79.

The swinging frame (Figs. 6 and 7) is under control of a lever 101 (Figs. 10 and 11) formed integral with a U-shaped member 102, loosely mounted on a shaft 103 fixed in the walls 64 of the keyboard. The lever 101 extends through the cover of the keyboard and is provided with a cylindrical head. Secured to the shaft 97, on which the swinging frame is secured, is an arm 104 (Fig. 7) which is connected to the lever 101 by a link 105. A lever 106, secured to shaft 103, is adapted to cooperate with an extension on the "lower" key 49.

When it is desired to verify 45-column cards the lever 101 is drawn toward the front of the machine, thereby rocking shaft 97 (Fig. 7) clockwise, thus placing the swinging frame in a position where the bars 98 are aligned with the Bowden wires 74 and 79. The movement of lever 101 also rotates shaft 103 counter-clockwise, thereby bringing arm 106 into contact with the tail of the "lower" key 49, raising it, thus causing link 90 to rotate the cylinder 83 to the position shown in Fig. 16. With the decoding unit so positioned, each of the twelve keys is connected through to one of the twelve sensing pins in accordance with the 45-column code.

Figure 49:
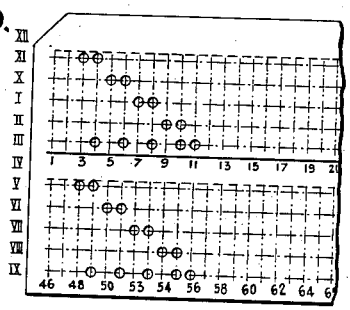
Fig. 49 shows a portion of a card punched in the 90 column code.
Figure 50:
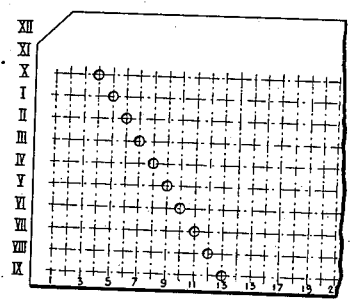
Fig. 50 shows a portion of a card punched in the 45 column code.

The bars 98 are formed as shown in Fig. 19 and enter the plates 94 at one point and leave it at another, as indicated by the dotted lines (Fig. 18). This permits the twelve key to operate the "OU" plunger in cylinder 83, which causes the selection of a pin in the XII position (see Figs. 49 and 50). The operation of the 6-key causes the operation of the 3L plunger, thereby selecting a pin in the VI position of the column, When it is desired to verify cards using the 90-column code, the lever 101 is restored to the position of Fig. 7, thus swinging the translator frame to a position wherein the rods 99 are aligned with the Bowden wires 74 and 79. It will be noted in Fig. 18 that each of the rods 99 is provided with a head 100 (Figs. 14 and 18) of the same diameter except the "9" plunger which is of a diameter large enough to be engaged by the rods actuated by wires 74 from the even digit keys. The wires from odd digit keys actuate plungers designated "1, 3, 5, 7," which are free to move individually, whereas the rods designated "2, 4, 6, and 8" engage the head of the next lower digit plunger and the nine plunger, that is, a wire from the "2" key engages the "1" and "9" plunger.

When the translator is positioned for 90-column work, the lever 101 is positioned as shown in Fig. 7, thereby shifting the frame so that the plungers 99 are aligned with the cylinders 80 and 83. If the portion of the card to be sensed is in the upper zone, the "upper" key 48 is depressed, thereby rotating the cylinder 83 counter-clockwise into position (Fig. 16) so that all of the plungers designated with a "U" after a numeral are in line with the heads 100 on the plungers 99. If the data is in the lower zone, the "lower" key 49 is depressed, thereby rotating the cylinder 83 in a clockwise direction (Fig. 37) to the position to present all of the plungers which are designated with an "L" after a numeral to the plungers 99.

*Main drive*

The machine is driven by an electric motor 110 (Fig. 4) which is suitably mounted on the base 50. The shaft of the motor is coupled to a short shaft 111 journaled in a bearing 112 secured to the base. Fastened to shaft 111 is a worm 113, meshing with a gear 114 (Fig. 33) secured to the main drive shaft 115. The shaft 115 is journaled at one end in the bearing 112 and at the other in frame 60.

Secured to or mounted on shaft 115 is a series of discs, pawls, and ratchets under control of the trip, eject, and carriage return keys, which constitute the three main controls of the machine. The discs, pawls and ratchets constitute clutching devices which control the operation of feed rolls, eject rolls, the carriage return drum, and the cam shaft which times the operation of the card picker knife, pressure rolls, card gripper, and restoration of the no-card feed pin.

Each of the keys controlling the above devices with its associated mechanism will be described separately hereinafter.

*Card carriage*

Figure 20:
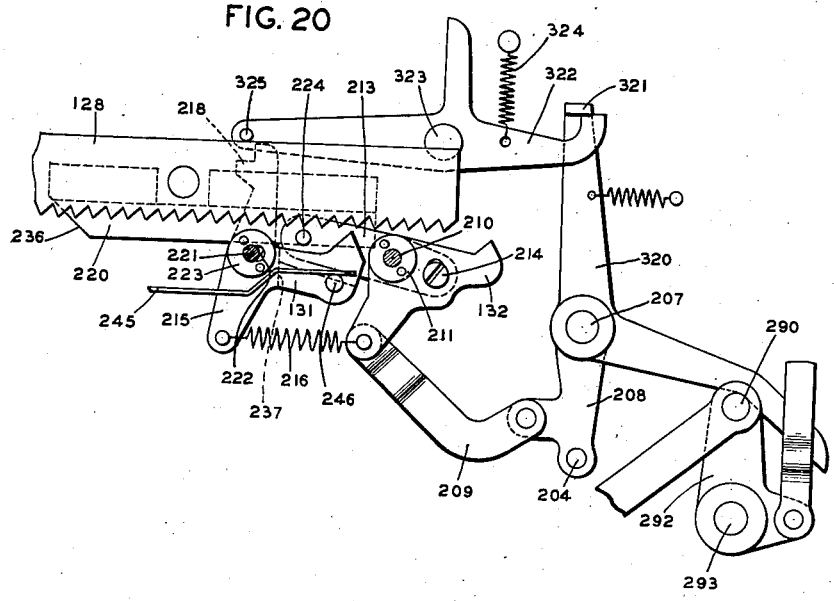
Fig. 20 is an enlarged detail view of the escapement mechanism, together with the error release mechanism.
Figure 13:
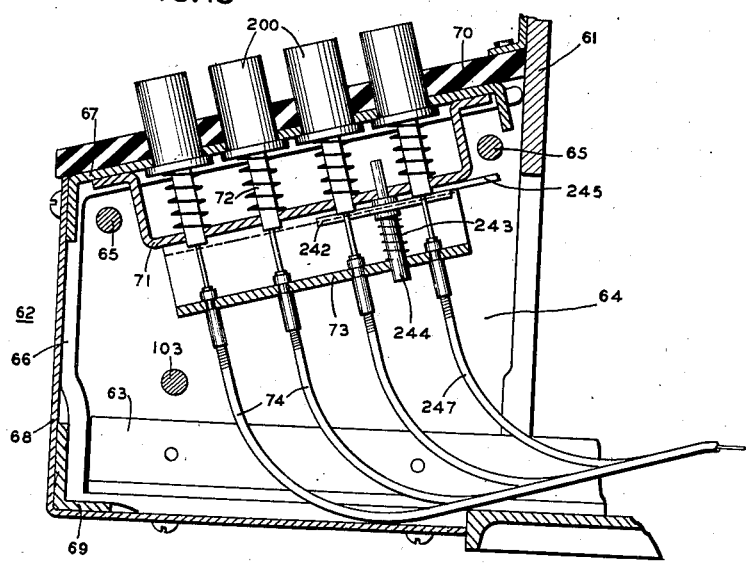
Fig. 13 is a right-hand sectional view of the keyboard taken along the line 13—13 of Fig. 11.

Referring to Figs. 5, 6, 8, and 9, the card carriage comprises an L-shaped bracket 117 to the top surface of which is mounted a bracket 118 having a roller 119 mounted thereon which follows a track or channel 120 secured at its left-hand end to a bracket 121 on the end frame 55 and at its right-hand end to an inverted U-shaped bracket 122, secured to the front and rear walls 56 and 57. Secured to the underside of the L-shaped bracket 117 is a card gripper mechanism which will be described in detail hereinafter. To the front of the vertical leg of the bracket 117 is secured a narrow strip 123 (Figs. 1 and 8) having two rows of holes for accommodating tabulator stops. The right-hand end of strip 123 is secured to a plate 124. Mounted on the bracket 117 and the plate 124 are flanged rollers 125 which are adapted to ride on a rail 126. Studs 127 are secured to a ratchet bar 128 and extend under rail 126 so that they are adapted to prevent the carriage from vertical displacement. The rail 126 is secured at its left-hand end to the frame 51 and at its right-hand end to the frame 56 by means of brackets 129. Secured to the bottom of the vertical arms of the bracket 117 and plate 124 are a ratchet bar 128 and a rack bar 130, the rack bar 130 having gear teeth cut therein for meshing with a driving gear and the bar 128 being formed with ratchet teeth for cooperation with a pair of pawl members 131 and 132 (Fig. 20). The normal position of the carriage is at the extreme left-hand of the machine as shown in Fig. 1.

*Card handling mechanism*

A table comprising a series of plates is provided for handling the card. One plate 140 (Fig. 6) extends lengthwise at the right-hand side of the machine to the sensing position. A pair of plates 141 and 142 (Figs. 3 and 38) extend from the sensing position toward the left end of the machine.

The plate 140 (Fig. 8) is approximately the size and shape of a card and is supported on a pair of angle brackets 143 secured to the front and rear frames 56 and 57, respectively. Secured between the bracket and the plate 140 is a channel member 144 which serves as a card guide and stop. The rear edge of plate 140 is bent downwardly at an angle to provide the lower portion of a card guide. Secured to an angle bracket 145 mounted on the rear frame 57 is an upper guide strip 146 having the rear edge bent upward to form a guide member.

The plates 141 and 142 are supported on angle brackets 147 secured to the front and rear frames 51 and 53. A guide or stop member 148 similar to 144 is secured to front plate 141. An angle strip 149 is secured to frame 53 above plate 142 and forms a guide for the card.

Secured to the underside of the plate 140 is a pair of spring arms 139, each having an extrusion 138 formed thereon which extends through the plate 140. Mounted in the block 172 is a pair of round headed pins 137 which are spring-urged upwardly through the plate 140. It will be noted that the extrusions 138 and pins 137 are located to the left (Fig. 6) of the feed rolls 163 in such a position that they will engage the right-hand edge of a card when being returned by a carriage return operation, and thus carry the card over the feed rolls to prevent damaging the edge of the card. A pair of similar spring arms 136 are provided to the right (Fig. 5) of each of the eject rolls 165, thereby preventing damage to the card during a step-by-step escapement to the left in the machine.

In passing a card through the machine, it is fed from the card magazine 59 on to the plate 140 where it is grasped by a card gripper and drawn past the sensing position a column at a time until the sensing is finished. At the left side of the machine it slides on plates 141 and 142 until it reaches the extreme left of the machine where the card gripper is released and a set of eject rolls transmit the card to either one or the other of a pair of card pockets.

Situated below the card magazine 59 (Fig. 8) is a card picker and its associated drive mechanism which is well known in the Powers type of machine. An eccentric 150, mounted on shaft 151, is connected to an arm 152 pivotally mounted on a shaft 153. The upper end of said arm is connected to a picker block 154 which carries an adjustable knife 155. The knife is adapted to pick a card from the bottom of a stack in the card magazine and feed it forward between a pair of feed rolls 156 and 157 mounted on shafts 158 and 159, respectively. The upper rolls 157 are spring-pressed into contact with the lower rolls by a spring 160. Mounted on shafts 161 and 162 and extending through slots in the card plate 140 are two pairs of feed rolls 163, one pair to each shaft. Positioned directly above each of the rolls 163 is a spring-pressed roll 164.

On the left-hand side of the machine is a pair of eject rolls 165 (Figs. 5 and 38) secured to shaft 166 and extending through slots in the plate 142 and have associated therewith a pair of spring-pressed rolls 167. Located directly behind the eject rolls are two card pockets, one pocket 168 for correctly punched cards and the other 169 for rejected error cards. The feed rolls 156, 157, and 163 and the eject rolls 165 are gear driven in a manner to be described hereinafter.

Card handling

At the sensing position is located a U-shaped plate 170 (Fig. 9) secured to the front and rear walls 51 and 53 having twelve holes 171 formed therein corresponding to the code positions in a column of a Powers punched card. Located directly below and secured to the side frames is a block 172 having twelve holes therein corresponding to holes in the plate 170 in which are positioned the upper ends of sensing pins 173, the lower ends being guided in a comb 174 secured to the front and rear walls.

Card-gripper

The card, while on the card table, is carried lengthwise of the machine by a card-gripper mounted upon a movable carriage. Suitably secured to the L-shaped member 117 of the movable carriage is a U-shaped bracket 180 (Figs. 5, 21, 22, 23, and 38). The bracket has, journaled in its two downwardly extending sides, a short shaft 181. The shaft 181 is held against lateral movement in bracket 180 by a pair of collars secured to the shaft. A U-shaped jaw member 182 is pivotally mounted on shaft 181 and is held against a pin 183, on bracket 180, by a spring 184.

The bracket 180 has a downwardly extending arm 185 on which is supported one end of a short shaft 186. The other end of the shaft 186 is supported in a cross piece 187 suitably mounted between two downwardly extending sides of the bracket 180. Secured to the extreme left end of the shaft 186 and adjacent to member 185 is an upwardly extending arm 188, which is adapted to be rocked by a pin 189 on an arm 190 fixed to a shaft 191.

Also fixed to the shaft 186 is an upwardly extending latch 192. Formed integral with said latch 192 is an arm 193 connected by a spring to member 182 and which serves to hold the nose of the latch 192 against the edge of a slot 194 provided on the top of the member 182 (Fig. 23). Positioned in the jaw member 182 is a pair of screws 195 having elongated shanks that terminate in a threaded portion which are screwed in a jaw plate 196 and held resiliently away from the underside of the top of the member 182 by springs 197.

Secured to the shaft 191 is an arm 198, which, when the card gripper is at its extreme right-hand position, is adapted to rock the jaw member 182 about its pivot 181. This will cause the plate 196 to move downwardly and clamp against the cross piece 187, while the nose of the latch 192 will pass through the slot 194 and engage the top of member 182.

A better understanding can be obtained of the foregoing description by following through a carriage return operation. The card-gripper carriage, which in normal position lies at the extreme left end of the machine, is shown in Fig. 5. When the trip key is operated, as will be described in detail, hereinafter, a card is immediately fed from the magazine 59. Shortly after the card has come to rest against the card stop 144, the card-gripper has made its full travel to the right to a position alongside of the sensing mechanism, as shown in Fig. 21. In this position the plate 196 lies directly above the left-hand edge of the card that has just been fed. The cross piece 187 lies directly beneath said left-hand edge.

At this point the shaft 191 rocks the arm 198 downwardly, thereby rocking member 182 downwardly, thus clamping the card between jaw plate 196 and the cross piece 187. As the member 182 is rocked downwardly, the nose of latch 192 passes through the slot 194 and engages the top of member 182. It will be seen that the card-gripper at this point has gripped the card and is in latched position. The card is now ready to be fed step-by-step past the column of sensing pins. Upon the completion of the sensing of the card, the card-gripper is automatically brought back to its extreme left-hand position ready for the eject operation, as will be described hereinafter.

At this time an eject key is operated rocking the shaft 191 in a clockwise direction rotating arm 190. The pin 189 on arm 190 rocks the arm 188, thereby rotating shaft 186 to disengage the latch 192. The tension of spring 184 then causes the jaw member 182 to rock upwardly and allows plate 196 to release the card. By this time the eject rolls have started to rotate, thus ejecting the card into the proper pocket.

Carriage escapement

The mechanism for the step-by-step escapement of the carriage toward the left of the machine is shown in Figs. 1, 9, 20, and 24, and is of the double pawl type. As was previously described, the card carriage supports an escapement rack 128 and a rack 130. The teeth of rack 130 are continually in mesh with a gear wheel 205 which forms part of a suitable spring drum 206, the purpose of which is to move the carriage from right to left in conjunction with the escapement mechanism. The carriage normally stands in its left-most position as shown in Fig. 1. When a card is to be fed into a sensing position, the carriage is moved to its extreme right-hand position, whence it is conditioned to begin its step-by-step movement toward the left.

Figure 24:
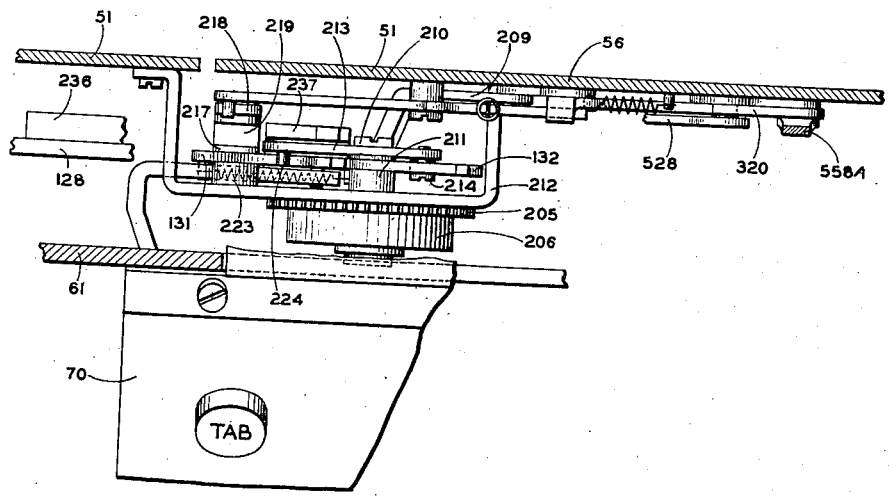
Fig. 24 is a fragmentary top plan view, disclosing the escapement mechanism and associated tabulating key connection.
Figure 11:
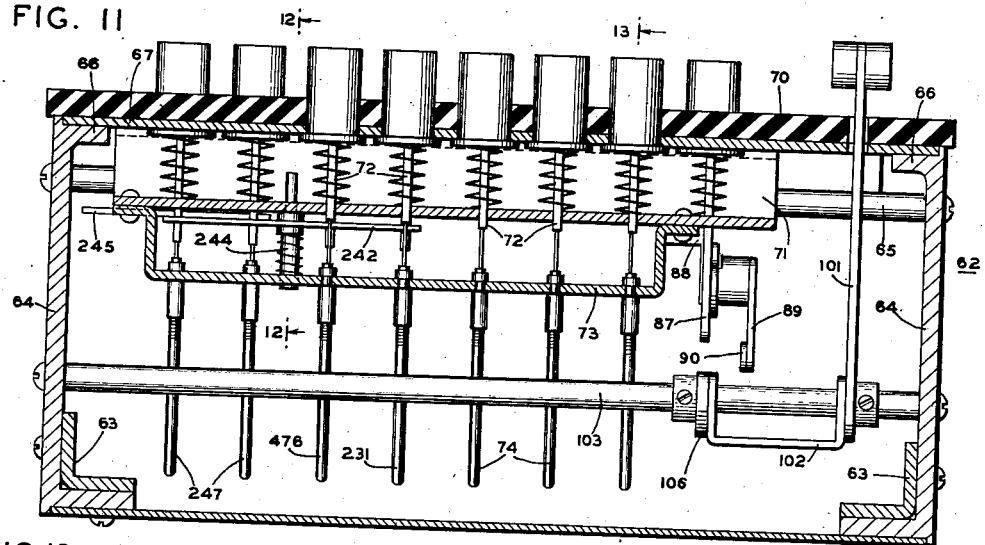
Fig. 11 is a cross section of the keyboard taken along line 11—11 of Fig. 10.
Figure 10:
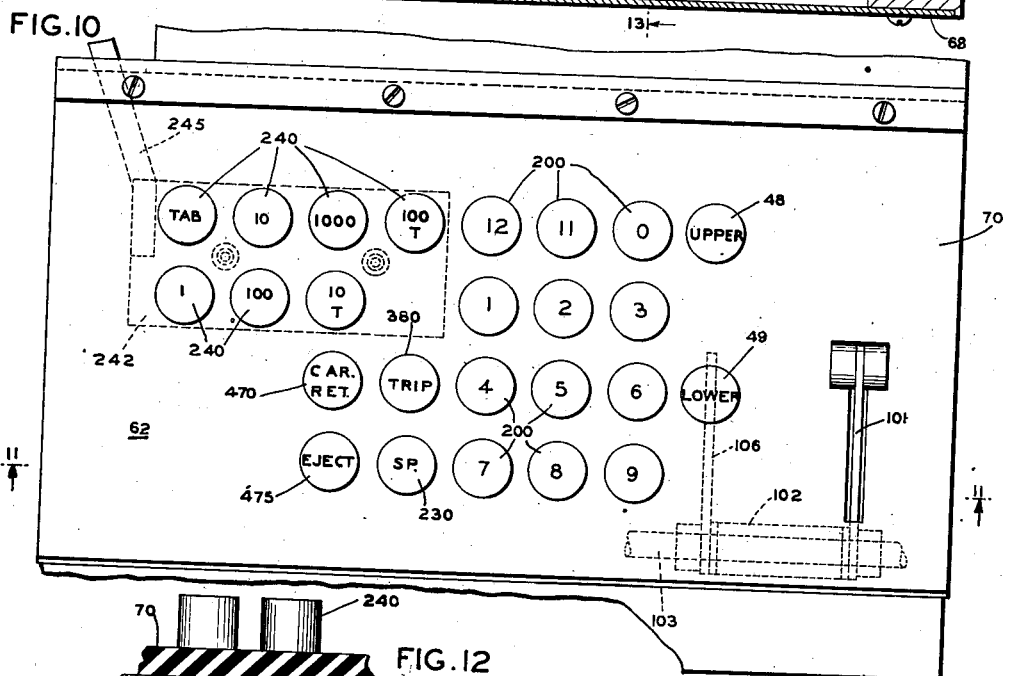
Fig. 10 is a top plan view of the keyboard.

When a numeral key 200 is depressed a shaft 207 is rocked counter-clockwise. As is seen in Figs. 8 and 20, there is fastened to the shaft 207 two arms 203 and 208 carrying a bail 204 actuated by a space or numeral key operation. The arm 208 is pivotally attached to a link 209 the opposite end of which is connected to an escapement pawl 132. The pawl is pivoted upon a stud 210 which, as is best shown in Figs. 9 and 24, extends forwardly into a block 211, which block is held fast upon a bracket 212, suitably fastened to the front frame walls 51 and 56. A lever 213 also is mounted upon stud 210 and carries a headed screw 214 which screw cooperates with a slot in pawl 132 in such a manner that the travel of the pawl toward the teeth on the escapement rack 128 is adjustable. From the foregoing it is seen that each time a numeral key is depressed the arm 208 will pull the link 209 toward the right, as seen in Fig. 20, and thus rock the pawl 132 counter-clockwise about the stud 210 to engage the pawl with the teeth of the escapement rack 128.

A holding pawl 131 is formed, as will be seen in Fig. 20, with a depending arm 215, to which is secured a spring 216, the other end of which is attached to the pawl 132. The spring 216 tends constantly to draw the pawl 131 into engagement with the teeth of the escapement rack 128. The pawl 131 is made fast to a rearwardly extending hub 217 on the rear end of which is secured an upright latch 218. The hub 217 is formed with a groove 219 to permit the passage of a cam plate 220 secured to the rack 128. A screw 221 passes through the slot 222 formed in a block 223 secured to bracket 212 (Fig. 20). The screw 221 forms a pivot for the pawl 131. It will thus be seen that, while the pawl 131 may pivot about the screw 221, it may also move laterally a small distance upon this screw. It will further be seen that the arm 218, the hub 217, and the pawl 131 move together as a unit.

A pin 224 secured in the arm 213 of the escapement pawl overlies the holding pawl 131 so that when the arm 213 is rocked counter-clockwise as described above the pin engages pawl 131, thereby rocking it out of engagement with the rack 128. Simultaneously, the pawl 132 engages the rack 128 holding it until the numeral key 200 is released. Upon release of the key the shaft 207 rocks clockwise drawing pawl 132 out of engagement with the rack and permitting pawl 131 to again engage the rack. The spring drum 206 then draws the rack 128 to the left until the right end of slot 222 limits against the screw 221 thereby stepping the carriage one space equivalent to the distance between columns.

When the card reaches the position of the 45th column, the right-hand end of the card is not free of the sensing mechanism. Therefore, mechanism is provided for automatically moving the card carriage to the eject position.

This mechanism comprises a cam plate 220 secured to the rear of rack 128 which plate is grooved to permit free movement of arm 213. Formed on the left-hand end of plate 220 is a cam face 236. Secured to the rear face of pawl 131 is a block 237 formed as shown in Figs. 20 and 24 and having a groove cut therein corresponding to the groove in plate 220 for accommodating arm 213.

When the carriage reaches the 45th position, the cam face 236 will contact the block 237. Upon operation of pawl 132 the rack 128 is held stationary and the pawl 131 is withdrawn from the rack. Upon withdrawal it snaps to the right in slot 222 to a position in which it is ready to engage the top of the next tooth to the right. When the pawl 132 is withdrawn from the rack it moves to the left, thus causing cam face 236 to rock the pawl 131 clockwise through the medium of block 237, thus preventing said pawl from engaging the rack, thereby permitting the drum 206 to draw the carriage to its extreme left-hand position.

Space key

Figure 25:
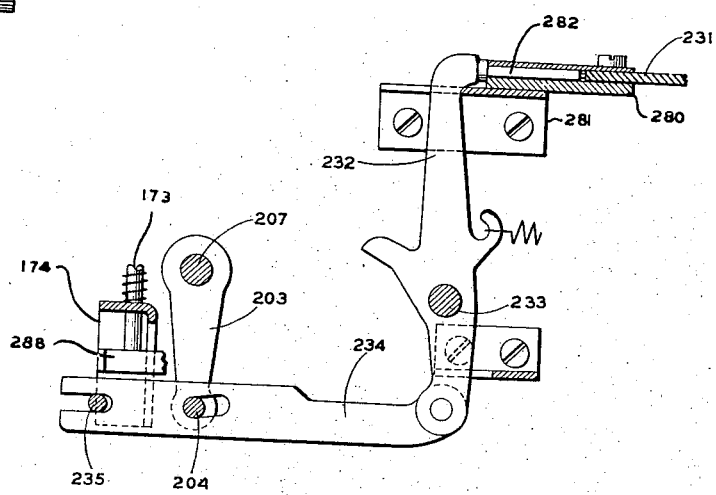
Fig. 25 is a detail view of the mechanism associated with the space key.

A space key 230 is provided which is connected by a Bowden wire 231 (Fig. 25) to a lever 232. This lever is pivoted on a shaft 233 and has a link 234 pivotally connected thereto which is mounted on a bail 204 and carried on a cross rod 235. The bail 204 is carried by the arms 203 and 208.

When the space key is operated the lever 232 is rocked counter-clockwise, drawing link 234 to the right, rocking shaft 207 in a counter-clockwise direction, thereby operating the escapement mechanism as described above.

Tabulator

It is often desired, while sensing a card, to skip a group of columns which do not have any holes punched therein or to skip those columns in which the information is of such nature that it does not require verification.

Figure 12:
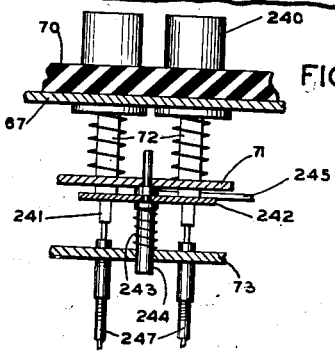
Fig. 12 is a fragmentary detail cross section taken along line 12—12 of Fig. 11, showing a tabulator key connection.

For this purpose a plurality of tabulator keys 240 (Figs. 10 and 12) are provided. The tabulator keys are similar in construction, to the other keys on the keyboard except that their lower ends are provided with shouldered extensions 241 which are adapted to protrude through and engage a bail plate 242. The bail plate 242 is resiliently mounted on the U-shaped bracket 73 by springs 243. The springs 243 surround pins 244 which pins are secured to the bail 242 and are guided for vertical movement at their upper ends in plate 71 and at their lower end in bracket 73. The bail plate 242 is limited in its upward movement by the shouldered extensions 241.

Secured to bail member 242 is one end of a rearwardly extending arm 245. The other end of this arm rests upon a pin 246 in the escapement pawl 131 (Fig. 20). When any tabulator key is depressed, the bail plate 242 causes the arm 245 to rock the escapement pawl downward, thereby releasing the carriage until it is stopped, as will hereinafter be described.

The tabulator keys engage, at their lower ends, Bowden wires 247, the casings of which are fixedly mounted, at their rearward ends, upon an ear 248 (Figs. 26 and 27) of a U-shaped bracket 249. The Bowden wires 247 are adapted to engage lugs 250 formed on arms 251. The arms 251 are loosely mounted upon a shaft 252 journaled at its ends in upwardly extending arms of the bracket 249 and are held resiliently against the ends of the Bowden wires by springs 253. One end of each spring is connected to hooks, on the arms 251, and the other end to an upturned ear on a bracket 254 mounted on the upwardly extending arms of the bracket 249.

The arms 251 have formed thereon projections 255, which have pivotally connected thereto links 256. The other ends of the links 256 are connected to the lower arms of the bell-cranks 257 loosely mounted upon a shaft 258, which is journaled at its ends, in a U-shaped bracket 259 suitably mounted upon the inner side of the right-hand front frame 56. A comb plate 260 is provided to guide the lower arms of the bell-cranks 257, the upper arms of which are provided with noses 261 adapted to engage lugs 262 on upwardly extending tabulator stop arms 263. The lower ends of the stop arms 263 are loosely mounted upon a bail rod 264 which is carried in a pair of arms 265 and 266 made fast to a laterally extending shaft 267. The left-hand end of the shaft 267 is mounted in the bracket 259 and the right-hand end is journaled in the end frame 58. Secured to the shaft 267 is another arm 268 which has connected thereto a downwardly extending link 269 which is, in turn, connected to an arm 270 fastened upon the shaft 77, which is mounted at the left end in a bracket 271 and the right-end in the frame 58.

Secured between the vertical arm of bracket 117 (Fig. 1) and the plate 124 on the card carriage are two cross bars 123 each bar having two rows of 45 holes. The distance between the holes is equal to the distance between the columns of a card, and the holes are adapted to receive tabulator stop pins 272 (Fig. 27) which pins protrude from the inner cross bar 123. The stop pins 272 are positioned at predetermined points at which it is desired to stop the card carriage, and are adapted to engage forwardly protruding noses 273 of the arms 263 which noses are guided in a U-shaped comb 274.

It is seen from the above description that when the tabulating key is depressed, the arm 251 rocks the bell-crank 257 which, in turn, rocks the nose 273 of the tabulator arm 263 forward and into the path of the tabulating pins 272.

As was described above, when the "upper" or "lower" key is operated, the machine is conditioned for sensing the upper or lower zone of a card, respectively. When the "upper" key 48 is operated, the shaft 77 is rotated in a counter-clockwise direction (Fig. 27), thereby raising the stop arm 263 into a position in which the nose 273 will be engaged by the upper row of pins 272. It follows that, if the "lower" key 49 is actuated, the shaft 77 will be rotated clockwise, lowering the nose 273 into the path of the lower set of pins.

When a tabulator key 240 is operated the arm 245 will release the escapement mechanism as described above, and simultaneously arm 251 is rocked causing the bell-crank 257 to rock the nose 273 of the stop arm 263 into the path of the pins 272, thereby stopping the carriage at the next tabulating point.

There are seven tabulating keys 240 provided, i. e., "TAB, 1, 10, 100, 1000, 10T, and 100T". Associated with each of the seven tabulating keys is a linkage such as described above. The keys other than the "TAB" key are provided to permit the carriage to be spaced within certain limits beyond the exact position of the tabulating stop pin 272. For instance, if it is desired to stop the machine four columns of spaces beyond the tap stops, the "1000" key is operated, thereby introducing the corresponding stop arm in the path of the pins 272.

*Sensing and verifying mechanism (Figs. 6, 7, 8, and 9)*

Referring particularly to Figs. 6 and 7, with a card in position to sense the first column, the operator depresses the key or keys corresponding to the data contained in the first column. For purposes of description, it will be assumed that the data is represented first by a single perforation. When the key is operated the Bowden wire 79, which is anchored in a plate 280 (Fig. 6), secured to a bracket 281, which bracket, in turn, is secured to the front and rear walls of 56 and 57, respectively, cooperates with a plunger 282 carried in the plate 280. The plunger is individual to a lever 283 pivoted on a shaft 233. There are twelve of these levers, one for each possible perforation position in the column. Each lever has a link 284 pivotally connected to the bottom thereof. A lug 285, formed on the lever at a point above the pivot point, engages one of a pair of bail rods 286. The link 284 is formed with a fork at the extreme left end thereof (Fig. 6), which is adapted to straddle a cross rod 235, which forms a guide therefor. The upper arm of the fork is formed with a horizontal right angle lug 287, the purpose of which will be described hereafter. Each of the links 284 is positioned in the comb 174 and positioned directly above each link and in line therewith is a lever 288 which is held in spring-pressed engagement with the bottom of an associated sensing pin 173. The left end of lever 288 is provided with a vertical right angle lug 289, which lies in the path of lug 287 on link 284. The right end of lever 288 is provided with a fork which engages a bail rod 290 extending between two bell-cranks 291 and 292, which are, in turn, secured to an error shaft 293.

The link 284 is provided with a slot 294 in which is positioned the bail bar 204, which bar is carried by the arms 203 and 208 fastened to the escapement operating shaft 207. Each of the twelve links 284 is positioned on the bail bar 204 in such a manner that movement to the right of any one will cause the rotation of shaft 207. Each link 284 is also provided with a pin 295 which cooperates with the fork on a bell-crank 296 pivoted on a cross rod 297. Pivotally connected to the bell-crank 296 is a link 298 having a slot for cooperation with bail 204 and is provided with a lug 299 adapted, under conditions to be described, to cooperate with a shoulder 300 on lever 288.

Figure 29:
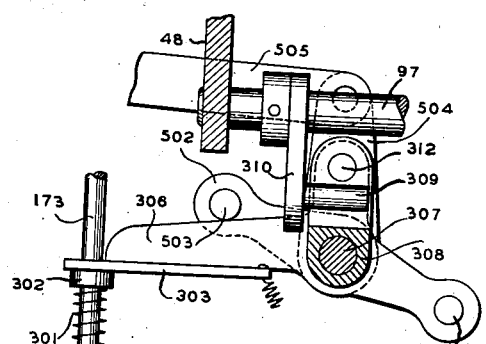
Fig. 29 is an enlarged sectional view, taken along line 29—29 of Fig. 28.
Figure 28:
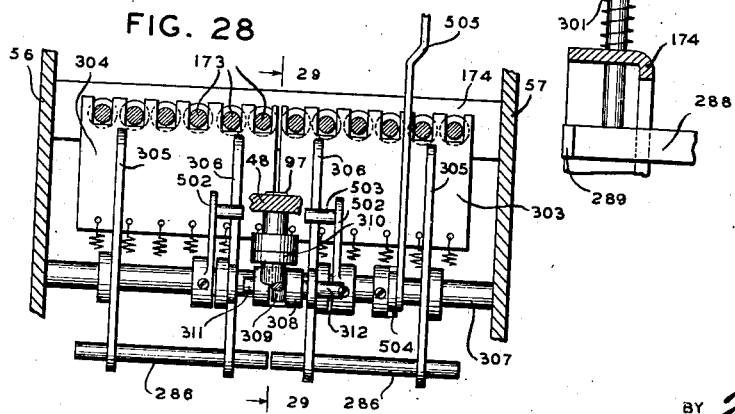
Fig. 28 is a detail plan view, partly in section, of the bail and associated mechanism for controlling the sensing device.

There are twelve sensing pins 173 mounted in holes formed in the comb 174 and a block 172, the pins being spring-urged upwardly by springs 301 which are located between the comb 174 and collars 302 secured to the pins 173. As is seen in Fig. 28, the pins are divided into two groups of six, and each group has associated therewith a comb member, one of which is designated 303 and the other 304. These combs are identical in structure and are designated by different numerals to clarify the later description. Each comb is secured, at the outer end to an arm 305 and at the inner end to an arm 306. The arms 305 and 306 are pivoted on a cross rod 307 secured to the front and rear frames 56 and 57. Extending between and beyond each pair of arms 305 and 306 is one of the bail rods 286. Slidably mounted on the cross rod 307 (Fig. 29) is a bifurcated arm 308, which cooperates with a pin 309 secured in an arm 310 which arm is fastened to the translator rock shaft 97. The arm 308 carries a pair of pins 311 and 312 which are in line and cooperate with holes in the arms 306. In the position shown (Figs. 6, 28, and 29) for permitting the sensing and verification of data in the lower zone and upper zone in a 90-column card, the pin 312 is in the hole in the right-hand arm 306 and pin 311 is free from the left hand arm 306. If, however, the translator is swung into the position for 45-column work, the arm 308 is slid along shaft 307 until both pins 311 and 312 are in engagement with the holes in the arms 306, thereby connecting bails 286 in operative relation.

The lugs 285 (Fig. 6) on the arms 283 cooperate with bail rods 286 in such a manner that, when the arm 283 is rocked in a counter-clockwise direction, either or both combs 303 and 304 are raised, releasing the pins 173, thus permitting them to rise and sense the card.

If a perforation is found the corresponding pin will rise permitting the lever 288 associated therewith to rise, carrying lug 289 out of the path of the lug 287 on the link 284. At the same time the link 284 has been drawn to the right (Fig. 6), rocking the shaft 207 through the medium of arms 203 and 208 and bail bar 204, thereby causing the escapement mechanism to step the card one step as was previously described. One or more perforations, if they are correct, will permit corresponding pins to rise in accordance with the code for the key punched and the operation will be the same.

If, however, upon operation of a key, no corresponding perforation is found in the card, the arm 283 will be rocked as before, but, due to no perforation, the associated pin 173 will not rise, thereby holding lever 288 in the position shown in Fig. 6, with the lug 289 in the path of lug 287. As the arm 283 continues to rock, the lug 287 engages lug 289, moving lever 288 to the right and, through the medium of the arm 291, rocks shaft 293, causing the escapement to release the card carriage and permit it to carry the card to the eject position, as will be described below.

If there is a perforation in a position in which there should be none, the operation of a key will cause the rocking of one or more arms 283, raising the comb 303 and permitting the pins to rise. The extraneous hole will permit a pin not associated with the rocked arm or arms 283 to rise, thereby permitting its associated lever 288 to rise. The movement to the right of the operated link 284 moves bail rod 204, thus rocking arm 298 in a clockwise direction. The arm 298 associated with the unoperated arm 283 rocks about its pivot, which is stationary, due to the fact that its associated bell-crank 296 has not been moved by a link 284. Rotation of arm 298 brings lug 299 into contact with the shoulder 300 on arm 288, which has been elevated to follow the raised pin. The engagement of lug 299 with shoulder 300 moves arm 288 to the right, thereby rotating shaft 293 in a clockwise direction through the medium of bell-cranks 291 and 292, thus operating the escapement mechanism as described below.

If any of the above errors are found and the shaft 293 is rocked, the escapement mechanism will be disabled permitting the carriage to move to the eject position.

This mechanism comprises a bell-crank 292 (Fig. 20) secured to the shaft 293, through the upright arm of which extends a portion of bail 290. Pivotally mounted on shaft 207 is a bell-crank 320, the horizontal arm of which cooperates with the extension of bail 290. The vertical arm of bell-crank 320 is formed with a right angle lug 321 adapted to overlie one end of a bell-crank 322, which is pivotally mounted on a stud 323 (Fig. 8) secured to the front frame 56 and is spring-urged in a counter-clockwise direction by a spring 324. Secured in the left-hand arm of bell-crank 322 is a stud 325, which is adapted to cooperate with the arm 218 secured to the boss 217.

When the error shaft 293 is rocked the extension of bail 290 will rock the lug 321 out of the path of bell-crank 322, permitting it to rock counter-clockwise and interpose stud 325 in the path of arm 218 which is in the position shown in Fig. 20. Upon release of the numeral key the pawl 131 is held out of engagement with the rack 128, thus permitting the carriage to move to the eject position.

Secured to the carriage frame member 117 (Fig. 1) is a stud 326 which when the carriage is drawn to the right by a trip or carriage return operation, will engage the vertical arm of bell-crank 322, rocking it clockwise into a position in which it is engaged by the lug 321, thereby restoring the mechanism to normal.

Also, whenever an error is found in a card the card receiver is prepared to receive the error card. There are two pockets in the card receiver, one comprising front and rear walls 327 and a right-hand end wall 328, the opposite end wall having been omitted to permit removal of the cards. The other is a trough-like structure 169 hinged at the rear to the rear wall 327. The latter pocket is used for the error cards.

Figure 40:
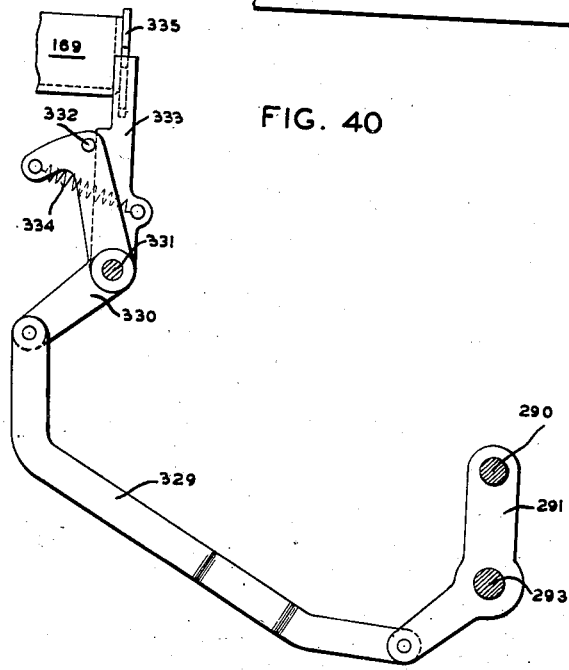
Fig. 40 is a detail of the linkage controlling the error card eject pocket.

As was described above, the error shaft 293 (Fig. 40) has a bell-crank 291 secured thereto, which has connected thereto an upwardly extending link 329 which is, in turn, connected to a bell-crank 330 pivoted on a stud 331, secured to the rear wall 57. The upper end of bell-crank 330 is provided with a pin 332 adapted to cooperate with an arm 333, freely mounted on the stud 331. The bell-crank 330 and arm 333 are resiliently connected by a spring 344. Secured to the side wall of the error pocket 169 is a plate 335 which is engaged by the upper end of the arm 333 and holds the pocket 169 in the position shown in Fig. 9.

When the error shaft 293 is operated the bell-crank 291 is rotated clockwise pushing link 329 upward, thus rocking bell-crank 330 clockwise and withdrawing the arm 333 out from under the plate 335, thereby permitting the pocket 169 to drop into alignment with the card passage to receive the ejected error card.

Secured in the side of the trough 169 is a pin 336 which is adapted to cooperate with one arm of a bell-crank 337 loosely mounted on a stud 338 secured in the frame 60. The upper end of the bell-crank is connected by a link 339 to an arm 340 secured to the shaft 191.

When the shaft 191 is rotated counter-clockwise at approximately the end of a cycle of the machine, the arm 340 will push link 339 toward the rear of the machine, rocking bell-crank 337 clockwise to raise pocket 169 through the medium of pin 336. With the pocket 169 elevated, the arm 333 will snap back under the plate 335, thereby holding the pocket 169 elevated and pocket 168 open to receive verified cards.

*Control key interlock*

In order to control the operation of the "trip," "eject," and "carriage return" keys, an interlocking mechanism is provided which is under control of the presence or absence of a card in the card-gripper.

The shaft 252 (Fig. 5) extends beyond bracket 249 as described above and is journaled in a bracket 350 secured to the base. Loosely mounted upon the shaft 252 are bell-cranks 351 and 352 and secured to the shaft 252 is a bell-crank 353. The bell-cranks 351, 352, and 353 are connected by wires 354 carried in rigid casings 355, to the "carriage return," "trip," and "eject" keys, respectively. The ends of the casings 355 are anchored in the upright lug 248 formed on the bracket 249, and each is associated with a right angle lug 356 formed on the bell-cranks 351, 352, and 353.

Figure 42:
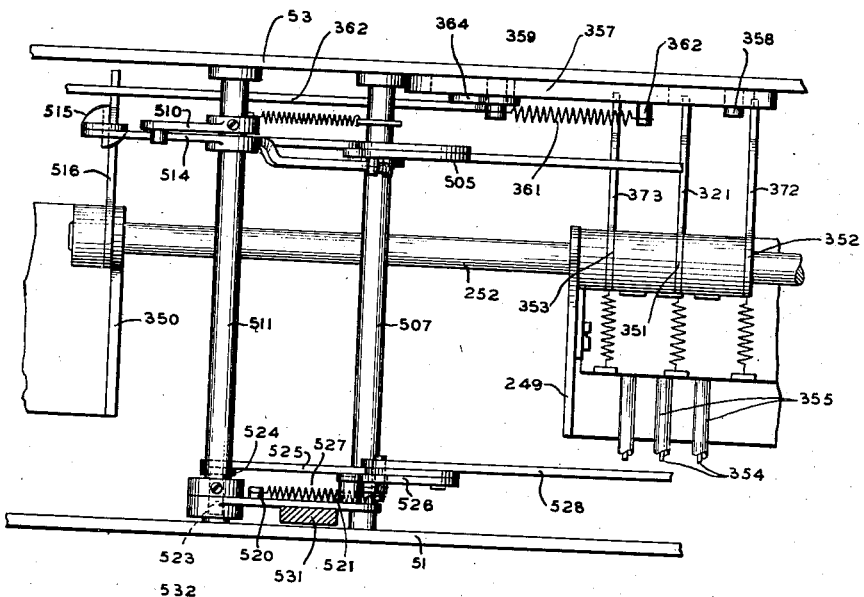
Fig. 42 is a partial top plan view of the linkage for the punch, carriage return and eject key lock mechanisms.

The locking mechanism comprises a locking slide 357 which is slidably mounted upon the rear frame of machine by studs 358 and 359 passing through elongated slots 360 in the slide. A spring 361 having one end connected to a pin 362 on slide 357 and on the other end to the stud 359 serves to hold the slide to the left as seen in Figs. 5 and 42. A pin 363 on a downwardly extending ear of the slide is adapted to be engaged and moved by an arm 364 loosely mounted on stud 359.

The arm 364 is connected by a link 365 to a bell-crank 366 which is pivotally mounted upon the rear frame 53 of the machine, and the upper arm of which extends through a slot in the card table 142.

It will be seen from the foregoing that when a card is brought to the left, the bell-crank 366 will be rocked counterclockwise (Fig. 5), thereby forcing link 365 downward, thus rocking arm 364 counterclockwise to move the slide 357 to the right through the medium of pin 363.

Figure 30:
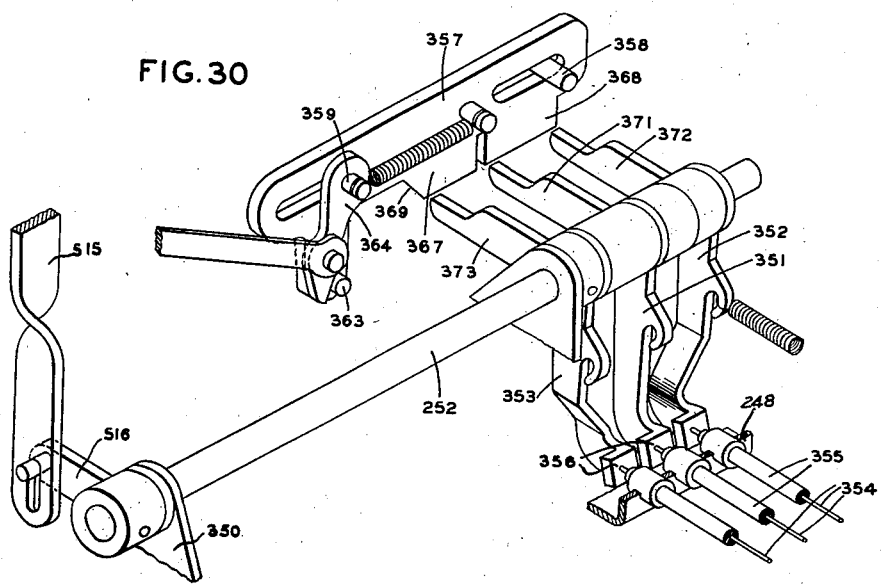
Fig. 30 is an isometric view, in detail, of the control key interlock mechanism.

The slide 357 is provided with two ears 367 and 368, the ear 367 being formed with a cam face 369. The ears 367 and 368 are adapted to cooperate with arms 371, 372, and 373 on respective bell-cranks 351, 352, and 353 (Fig. 30).

With the slide in the position shown in Fig. 5, bell-crank 352, associated with the trip key locking mechanism, is free to rock, thereby permitting the operation of the trip key.

The eject and carriage return keys, however, are prevented from operation due to the fact that their associated bell-cranks 351 and 353 will be engaged by the lower edge of ears 367 and 368.

With a card in the gripper at the extreme left position, the locking slide 357 is moved to the right as described above. The trip key locking mechanism is prevented from operating due to the fact that the ear 368 has been moved to a position above the arm 372 thereon. However, the carriage return key mechanism is now free to operate due to a slot formed between the ears 367 and 368 being positioned above the arm 371. The eject key is also free to operate with the slide in the above position, but the operation thereof will bring arm 373 into engagement with the cam face 369, thereby camming the slide 357 further to the right putting the ear 367 over the arm 371 of the carriage return key mechanism, thereby preventing the operation of the carriage return key. If, however, the carriage return key had been operated as above described, the arm 371 would be positioned in the slot between the ears 367 and 368, thereby preventing the camming of the slide 357 further to the right should the eject key be operated.

It is apparent from the above that with no card in the gripper, the slide 357 will not be moved and it will be positioned to permit only the operation of the trip key.

"Trip" key

As has been described above, the "trip" key 380 is operable only after a verified card has been ejected and there is no card in the card gripper.

Figure 31:
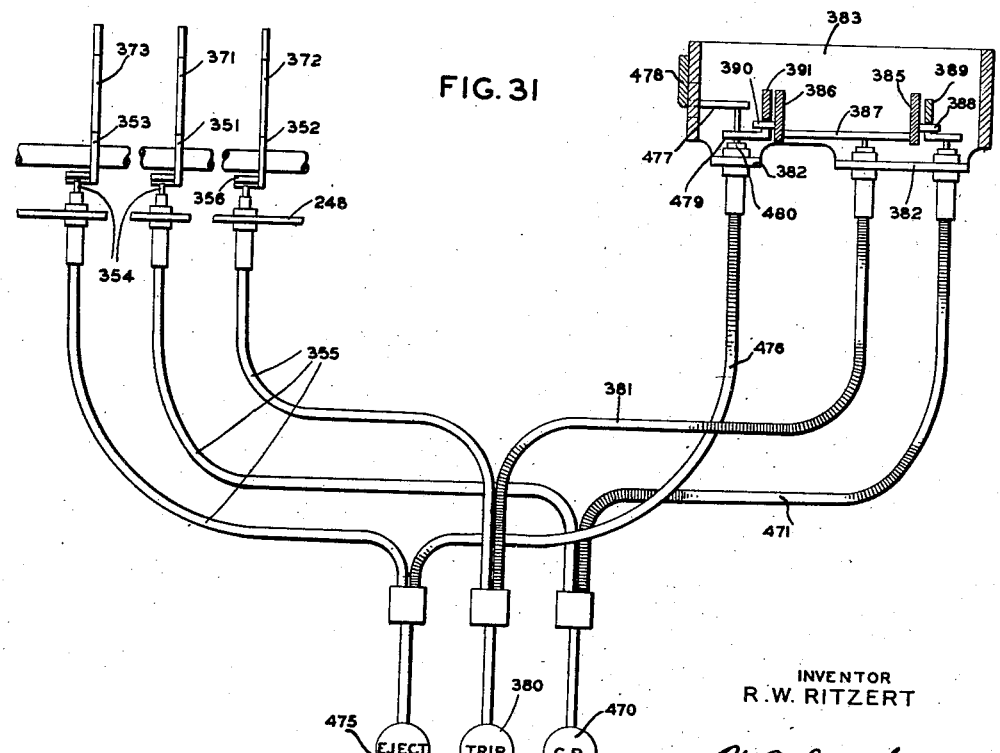
Fig. 31 is a schematic diagram of the connections to the interlock and mechanisms associated with the control keys.
Figure 32:
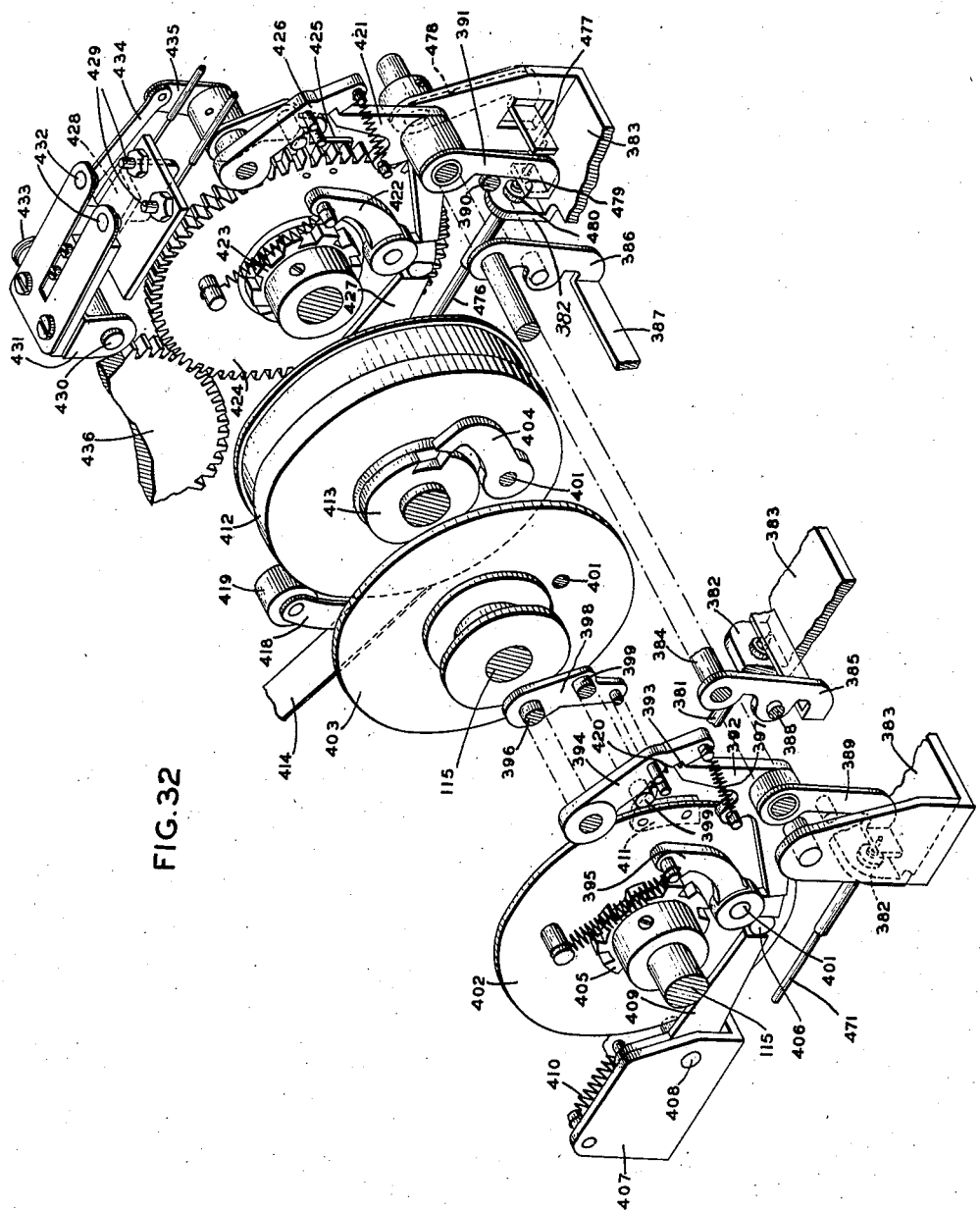
Fig. 32 is an exploded isometric view of the clutch and drive mechanism for the trip, eject and carriage return mechanisms.

The "trip" key is a non-locking plunger to which is secured a Bowden wire 381 which wire is Y-wired to its corresponding interlock wire 354 as described above. The Bowden wire 381 has a casing which is fastened to a lug 382, formed on the base of a frame 383 (Figs. 31 and 32). The frame 383 is formed with vertical side arms in which is mounted a shaft 384 on which are mounted two downwardly extending arms 385 and 386 formed integral with a bail 387 which bail lies in the path of the Bowden wire 381. The arm 385 (Fig. 32) is provided with a pin 388 which is adapted to rock an arm 389 rearwardly, thereby causing a carriage return operation. The arm 386 is provided with a pin 390 which is adapted to rock an arm 391, thereby starting the motor 110, thus starting the card feed and eject operations.

The arm 389 is pivotally mounted on the shaft 384 and has secured thereto a second bell-crank 392 the top of which engages a notch 393 in an arm 394 and the bottom of which extends into the path of a lug or foot formed on the bottom of a latch pawl 395.

Mounted toward the front of the machine and above the shaft 384 is a second shaft 396 (Figs. 7 and 33) which is journaled in an extension of the bearing 112 and the frame 60. The bell-crank 392 and the arm 394 are held in operative relation by a spring 397. A second arm 398 is fastened to shaft 396 and carries a pin 399 which cooperates with the lower edge of arm 394. These two arms are held in operative relation by a spring 400.

The above mentioned pawl 395 is secured to a short shaft 401 (Figs. 32 and 33) journaled in a pair of disc members 402 and 403 which are loosely mounted on the main drive shaft 115. On the other end of shaft 401 is secured a pawl 404. Secured to the shaft 115 adjacent the disc 402 is a notched clutch disc 405. The pawl 395 is adapted to be spring-pressed into engagement with the disc 405 to drive the discs 402 and 403.

Secured to the disc 402 is a stop pin 406 which cooperates with a tail on the latch pawl 395. Journaled in the upstanding arms of a bracket 407, secured to the base 50 is a shaft 408 having an arm 409 mounted thereon, which cooperates with the pin 406. The arm 409 is urged upwardly by a spring 410. A downwardly extending projection on the arm 409 serves to limit the upward movement thereof by contacting the base of the bracket 407.

Secured to the disc 402 is a cam faced plate 411 which is adapted to cooperate with the pin 399 on the arm 398.

Rotatably mounted on shaft 115 is a drum 412 to which is secured a single notched clutch disc 413. The pawl 404 mentioned above is adapted to cooperate with the notch in the disc 413. It is, therefore, apparent that the pawl 395 will drive the drum 412 through the medium of discs 402 and 403, shaft 401, pawl 404, and clutch discs 405 and 413.

The drum 412 has an annular groove formed thereon in which is secured one end of a tape 414 of suitable material which passes over a roller 415 (Fig. 7) mounted in the bracket 416 secured to the right-hand end frame 58. The tape then passes along the front of the machine (Figs. 1 and 2) and is secured to the upright frame 124 of the card carriage by a spring 417.

Loosely mounted upon the short shaft 408 is a spring pressed arm 418 having a roller 419 thereon, which rides on the periphery of the drum 412. The purpose of the arm and roller is to act as a brake for the drum 412.

From the above it will be seen that when the arm 385 is rocked the pin 388 will rock the arm 389 and bell-crank 392 counterclockwise, thereby releasing the pawl 395 and permitting it to engage the continuously rotating notched disc 405, thus driving discs 402 and 403. Simultaneously, the pawl 404 is rotated into engagement with the disc 413, thereby driving the drum 412. This will cause the tape to be wound around the drum, thereby returning the carriage to the sensing position. Upon rotation of bell-crank 392 the nose thereof is withdrawn from the notch 393 and enters a notch 420, thereby locking the bell-crank in its operated position.

Near the end of a complete revolution of the disc 402, the cam plate 411 contacts the pin 399, thereby permitting the bell-crank 392 to assume its normal position as shown in Fig. 7. In this position, the tail of the bell-crank is in the path of the tail on pawl 395. Upon continued rotation of disc 402 the tail of pawl 395 will contact the bell-crank 392, thus withdrawing the pawls from the discs 405 and 413. Simultaneously, the pin 406 will rock the arm 409 downward until the pin and the tail of pawl 395 are arrested by the bell-crank 392. At this time the arm 409 is snapped upward behind the pin 406, thereby preventing backward movement of disc 402.

Returning to the arm 386 which was rocked by the operation of the "trip" key, the pin 390 thereon is adapted to rock an arm 391 which is secured to a bell-crank 421 which is identical in size and shape as to the bell-crank 392. The function of the bell-crank 421 is also identical with that of the bell-crank 392 in that it releases a clutch pawl 422, similar to pawl 395. The pawl 422 is adapted to engage a clutch disc 423 which is identical to the disc 405 and is also fixed to the main drive shaft 115, which is driven by motor 110.

Loosely mounted on the shaft 115 is a gear 424 on which the pawl 422 is pivotally mounted. The arm 391, bell-crank 421, clutch pawl 422 and plates 425 and 426 are similar in construction and operation to members 389, 392, 395, 411 and 394, respectively, which have been described above. Arm 427, similar to arm 409, prevents back lash of gear 424 and cam plate 425, similar to plate 411, is provided for restoring arm 426. The arm 427 is secured to the shaft 408.

Fastened to the frame 60 is a bracket 428 carrying a pair of contacts 429. Mounted on the frame 60 is a stub shaft 430 on which is pivotally mounted a U-shaped bracket 431 having a pair of spring contacts 432 secured thereon, which are adapted to cooperate with contacts 429, which, when closed, complete the motor circuit. Secured to the bracket 431 is an arm 433, which is connected by a link 434 to another arm 435 fastened to the shaft 396.

It is then seen that when a "trip" key is operated, the bell-crank 421 will permit rocking of the arm 435 rearward through the shaft 386, thereby rocking the frame 431 closing the motor circuit through contacts 429 and 432. This starts the motor, thereby rotating shaft 115.

Meshing with the gear 424 (Fig. 7) is another gear 436 securely mounted on the right-hand end of the main cam shaft 151, which shaft is supported by the card feed frame 60, and drives the card feed mechanism as described above.

Referring to Figs. 3, 4, and 7, it is seen that, meshing with the gear 436 is a smaller gear 437, rigidly connected to a slightly larger gear 438 both being secured to the shaft 158 journaled at both ends in slots formed in the card feed frame 60.

Secured to shaft 158 are two feed rollers 156. Mounted fast upon the shaft 159, which shaft is also journaled in the above slots, are two pressure rolls 157 which are spring-pressed against the rolls 156 by springs 160. Fast upon the left-hand end of shaft 159 (Figs. 3 and 8) is a gear 442, which meshes with an identical gear fast upon the left-hand end of the shaft 158. It is thus seen that, as the shaft 158 is rotated counter-clockwise (Fig. 8) it will positively drive the shaft 159 in the opposite direction, thereby feeding a card into the machine.

The gear 438 (Fig. 7) meshes with an idler gear 444 rotatably mounted on a stud 445 which stud is held by the frame 60. Gear 444 meshes with a gear 446 secured to the shaft 161. Gear 446 meshes with an idler 447 supported on the right side-frame by a stud 448. Gear 447 meshes with a gear 449 fixed to shaft 162 journaled in the same frame. The left-hand ends of shafts 161 and 162 are journaled in the bracket 48 (Fig. 6), which is secured to the front and rear walls 56 and 57. Secured to the shafts 161 and 162 are feed rolls 163, which rolls are enclosed by the sensing chamber as is most clearly shown in Fig. 8. Lying directly above the feed rollers 163 are spring-pressed rolls 164.

From the above, it will be apparent that, when gear 436 is rotated, the gear train 437 to 449 will rotate the feed rollers to feed the card from the card picker on to the card plate 140 and against the stop 144 and between the fingers of the card gripper which at this time is in position to receive the card.

Secured to the cam shaft 151 (Figs. 6 and 7) is a cam 450 having two rises 451 and 452 formed thereon. Straddling the shaft 151 is a fork-shaped follower arm 453 having a roller 454 mounted thereon which is adapted to cooperate with the cam 450. Connected to the upper end of arm 453 is an arm 455 secured to the shaft 191. Secured to the shaft 191 (Fig. 8) is a bell-crank 456, to one arm of which is connected a link 457, the other arm of which cooperates with a stud 458 mounted upon a swinging frame 459, carrying one of the pressure rolls 164.

The other end of link 457 is connected to a bell-crank 460 pivotally mounted on the bracket 461 secured to the front frame 56. The bell-crank 460 carries a second pressure roll 164.

A spring 462 connecting bracket 459 and bell-crank 460 is adapted to hold the pressure rolls in contact with the feed rolls 163 and cause shaft 191 to be tensioned in a clockwise direction.

Also secured to the shaft 191 is the arm 198 which, as was described above, is adapted to close the jaws of the card gripper.

When the cam shaft 151 is rotated to cause the feeding of the card onto the card carriage, the roller 454 will roll off the rise 452, thereby permitting arm 453 to drop, thus rotating shaft 191 clockwise, and lower the pressure rollers 164 into contact with their associated feed rolls.

Toward the completion of a single revolution of the cam 450 the rise 451 will contact roller 454 and raise the link 453, rocking shaft 191 counter-clockwise to raise the pressure rolls 164 and rotate the arm 198 to close the jaws of the card gripper, thus gripping the card.

In this position, the card is ready to be sensed and is under the control of the escapement mechanism.

Carriage return key

In addition to the carriage return operation caused by the "trip" key, a separate "carriage return" key 470 is provided which is a non-locking plunger to which is secured a Bowden wire 471, the casing of which is fastened to the keyboard at one end and to the bracket 382 at the other end.

In this operation the Bowden wire 471 rocks only the arm 389, which actuates the bell-crank 392, thereby initiating a carriage return operation as was described in detail above.

In verifying 90-column cards, if, after sensing the upper portion of the card, it is desired to verify the lower portion, the "carriage return" key is actuated to return the card to the starting position. At the same time the decoding mechanism is shifted from "upper" to "lower" position as described above.

Eject key

When the card has been sensed, and the card gripper has brought it to the extreme left-hand position, it will then be in position to be ejected.

An eject key 475 (Figs. 3 and 31) is provided which is adapted to control mechanism for causing the ejection of a card. The eject key can only be operated when the card is at the extreme left-hand end of the machine and after a numeral key has been operated.

In order to prevent the operation of the eject key before the card has reached the extreme left-hand position, or a position directly in line with the receiving pocket, the key is blocked from operation by the key-locking slide 357 under control of the card presence finger 366 as described above.

It will be seen in Fig. 31 that the eject key operates two Bowden wires simultaneously. One Bowden wire 355 is connected to the key lock mechanism described above and the other 476 to the mechanism which drives the card free and the eject rolls.

Upon operation of the eject key, the motor switch is closed by the operation of arm 391 described above, to drive the train of gears shown in Fig. 7, which gears in turn drive the eject rolls in a manner now to be described.

The eject key 475 is operatively associated with the front end of Bowden wire 476 which runs rearwardly in the machine, and is mounted in the lug 382 on bracket 383. Referring to Figs. 32, 36, and 37, the Bowden wire 476 extends rearwardly from the lug 382 and is adapted to cooperate with a lug 477 formed on an arm 478 fixed to the shaft 384.

Located between the lug 477 and a collar 480 fixed to the Bowden wire 476 is a lug 479 formed on the arm 391. The lug 479 is adapted to be operated by the collar 480, which is spaced from the lug so that there is a predetermined amount of lost motion before the arm 391 is operated. The arm 478 is operated immediately the Bowden wire is moved.

The operation of the arm 391 is similar to that described above under the "trip" key, in that it closes the circuit to the motor and operates the clutch mechanism to rotate the gears 424 and 436 to rotate the cam shaft 151.

Figure 41:
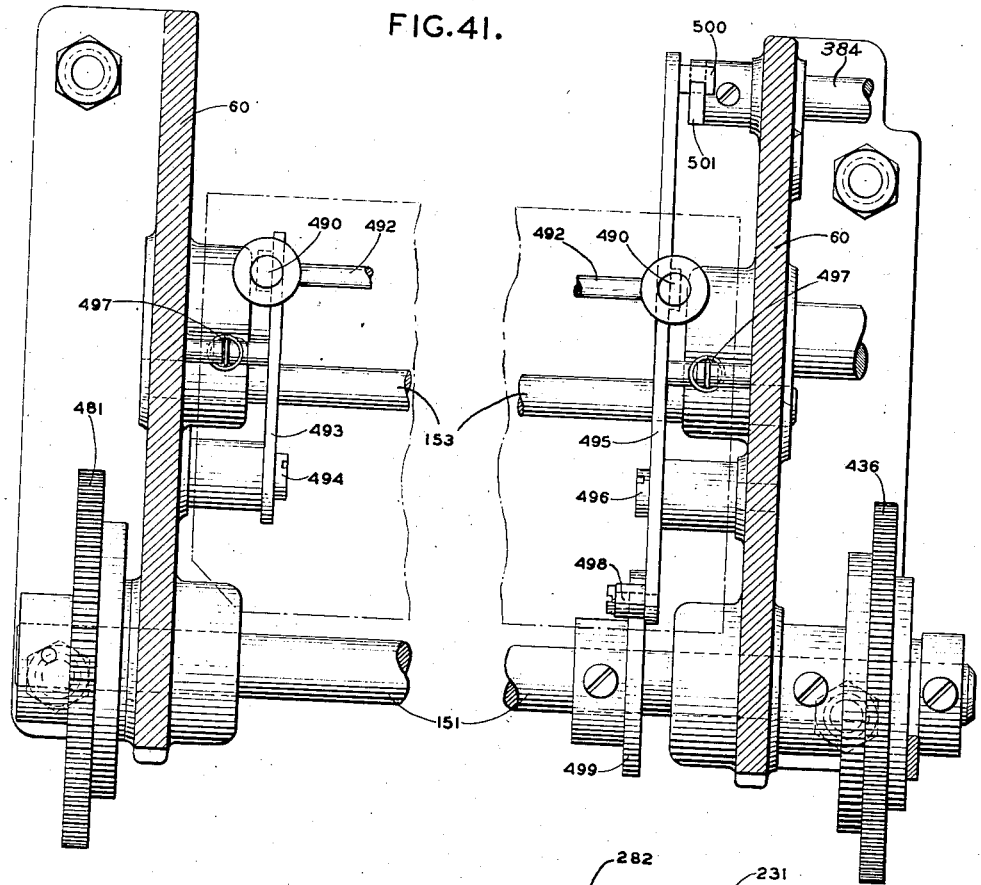
Fig. 41 is a plan view partly in cross section of the card feed disabling mechanism.

The shaft 151 (Figs. 3 and 4) extends across the machine to a position just beyond the card sensing position where a gear 481 is secured (Figs. 9 and 41). The gear 481 meshes with an idler gear 482 which in turn meshes with a gear 483 secured to the shaft 166 to which is also secured eject rolls 165. The shaft 166 (Fig. 5) is journaled at the right end in the left-hand frame wall 60 and at the left in the left-hand side frame 55.

It is seen from the above that upon operation of the "eject" key the feed rolls begin to operate therefore attempting to feed a card into the sensing position but this is not desired at this time due to the fact that the carriage is not in position to receive a card. Mechanism is therefore provided to prevent the card picker from feeding a card into the feed rolls. This mechanism comprises a pair of pins 490 (Figs. 8 and 41) located toward the rear and at each side of the card magazine 59. The upper portion of each pin is mounted for reciprocation in the bottom plate of the card magazine and in a plate 491 secured to the frame 60.

The bottom of the pins 490 are mounted upon a bail rod 492 to one end of which is secured an arm 493 pivotally mounted upon a stud 494 secured to the side wall 60. The other end of the bail 492 is mounted upon a bell-crank 495 pivotally mounted on a stud 496 to the opposite wall 60. The bell-crank 495 and the arm 493 are urged in a counter-clockwise direction (Figs. 8 and 41) by individual springs 497. The upper end of bell-crank 495 is provided with a follower roll 498 which cooperates with a cam 499 secured to the shaft 151. The other end of bell-crank 495 extends beyond the bail 492 and has secured thereon a pin 500 which cooperates with a latch 501 secured to the shaft 384.

It is thus seen that upon operation of the eject key the arm 478 is rocked counter-clockwise (Fig. 8) which through the medium of shaft 384 will rock the latch 501 releasing the bell-crank 495 to permit the pins 490 through the tension of springs 497 to raise the cards, in the magazine, out of the path of the card picker.

Immediately following this operation and upon further depression of the eject key the collar 480 secured to the eject Bowden wire 476 will rock the arm 391 counter-clockwise thus starting the motor as described above to drive the cam shaft 151. Near the completion of one revolution of the cam shaft the rise on the cam 499 will rock the bell-crank 495 clockwise thereby depressing the pins 490 and bringing the pin 500 into engagement with the latch 501 thus locking the pins down and permitting the cards to fall into the path of the card picker.

As was described under "Sensing and verifying mechanism" the operation of a numeral key 200 causes the bails 286 (Fig. 6) to rock clockwise. As will be remembered the bails 286 are carried by arms 305 and 306 which are in turn mounted on shaft 307.

Secured to the shaft 307 (Figs. 6, 28 and 29) are a pair of arms 502 in each of which is secured a pin 503 adapted to cooperate with the bail arms 306. Secured to the shaft 307 is an arm 504 the upper end of which is connected to a link 505 to which is connected a bell-crank 506 pivotally mounted upon a shaft 507 journaled in the frames 51 and 53. The other end of the bell-crank is formed with a hook 508 which cooperates with a pin 509 secured to a bell-crank 510, which is secured to a shaft 511 journaled in the front and rear frames. The upper end of the vertical arm of bell-crank 506 has a spring urged latch 512 pivotally mounted thereon, adapted to cooperate with a stud 513 secured to a bell-crank 514, which is pivotally mounted upon the shaft 511 and is connected by a link 515 to an arm 516 by a pin and slot connection. The arm 516 is secured to the shaft 252 on which is also secured the bell-crank 353 associated with interlocking mechanism for the "eject" key.

It is apparent from the above that when a numeral key is operated the rocking of either of the bails 286 will rotate shaft 307 clockwise thereby raising the hook 508 out of engagement with the pin 509. This permits the latch 512 to drop in holding relation with pin 513 thus holding the hook 508 elevated and permitting the interlocking bell-crank 353 to be rotated allowing the "eject" key to be operated.

Figure 43:
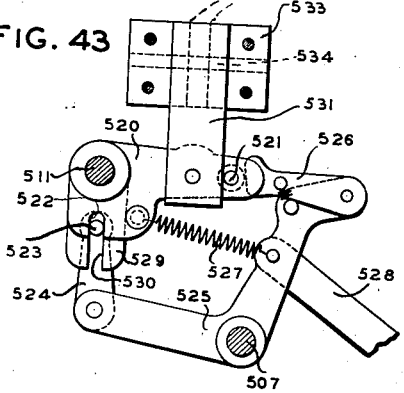
Fig. 43 is a detail front view of the punch and associated control mechanism in latched position.

Loosely mounted on the shaft 511 (Figs. 42 and 43) is a bell-crank 520 one arm of which carries a stud 521, and the other arm being formed with a slot 522 which is adapted to cooperate with a pin 523 secured to an arm 524 which is connected to a bell-crank 525 pivotally mounted on the shaft 507. The other arm of bell-crank 525 is provided with a latch 526 which is adapted to cooperate with the stud 521. The bell-cranks 520 and 525 are held in resilient connection by a spring 527. The upright arm of bell-crank 525 is connected to one end of a link 528 (Figs. 1 and 20). The other end of the link 528 is connected to the upright arm of bell-crank 292 fixed to the error shaft 293.

Secured to the shaft 511 (Fig. 43) is a depending arm 529 having a slot 530 which is in alignment with the slot 522 in bell-crank 520. The slot 530 is longer than the slot 522 and is adapted to also cooperate with the pin 523.

Loosely mounted upon the bell-crank 520 is an upright punch plate 531 having two V-shaped cutting edges 532, and is guided for vertical movement in a guide bracket 533 fixed to the left-hand front frame 51. The bracket 533 and the V-shaped cutting edges 532 are formed with a slot 534 to permit the passage of a card.

Thus it will be seen that when the error shaft 293 is rocked clockwise by means described above the link 528 will be drawn to the right (Fig. 1) thereby rocking the bell-crank 525 clockwise. The arm 524 will then raise the pin 523 so that the pin will engage both slots 522 and 530. At the same time the latch pawl 526 will ride off the stud 521 to the position shown (Fig. 43) thereby latching the bell-crank 525 so that the pin 523 will remain in both the slots in the arm 529 and bell-crank 520.

As was described above the operation of the "eject" key will rock the shaft 511 clockwise thereby rocking the arm 529 in the same direction. The pin 523 now engaging the slot in bell-crank 520 will rock the bell-crank clockwise thus lowering the plate 531 to cause the cutting edges 532 to mutilate the card.

Ink wick

In order to distinguish verified cards from unverified cards, a marking device has been provided. This device is automatic in its operation and is adapted to blacken the edge of a 90-column card corresponding to the zone that has been verified, i. e., if the upper zone has been verified, then the upper edge of the card is blackened and, if the lower zone of the card is verified, the lower edge of the card is blackened.

When the machine is in its normal position, the marking device is in position to blacken the upper edge of a 90-column card as is best seen in Figs. 7 and 9. In this instance the "upper" key 48 is in operated position. This key has a downwardly extending shank which is connected to shaft 77 through the medium of bell-crank 89 and link 90 and arm 76.

The rocking of the shaft 77 will, in addition to positioning the tabular stop arm 263 as described above, set one or another of a pair of ink wicks to be hereinafter described, to an active position for marking the edges of the card.

As is shown in Figs. 1, and 44 to 47 inclusive, the right-hand wall of the bracket 259 is formed with a slot 540. A pin 541 extends through the slot and is made fast in the bail arm 265. The other end of pin 541 is pivotally connected to a link 542 by a pin and slot connection. The upper end of link 542 is pivotally attached to a bell-crank 543 which supports the lower end of an ink wick 544. The bell-crank 543 is fastened to a shaft 545 which is supported by brackets 546 and 547 (Fig. 30). The bell-crank 543 is constantly tensioned counter-clockwise by means of a spring 548. As is seen in Figs. 46 and 47, there is fast on the left-hand end of the shaft 545 an upright arm 549 the upper end of which is connected by a link 550 to the bell-crank 551 (Fig. 47) whose depending arm supports and guides another ink wick 552. The bell-crank 551 is pivoted on a stud 553 which stud is fastened in a bracket 554 mounted upon the bracket 122. The upper end of each ink wick 544 and 552 is held in an ink retainer or cup 555 suitably supported on brackets 556 and 557 respectively, mounted on angle plates 558 secured to bracket 122.

From the foregoing it will be seen that when the shaft 77 (Fig. 45) is rocked clockwise by the depression of the "lower" key, it will pull down the links 269 and 542 to move the ink wicks to the respective positions shown in Fig. 47, wherein the ink wick 552 is contacting the lower edge of the card. The ink wicks are so arranged that, when one is in contact with the card, the other is out of contact therewith.

It is desirable when the machine finds an error in the punchings of a card, to leave that card uninked from the point of error to the end of the card. With particular reference to Figs. 45 and 46, when the machine finds an error it rocks the error shaft 293 in a clockwise direction as was previously described. Fast to the end of shaft 293 is a bell-crank 292 to the short arm of which is pivotally connected the lower end of a link 558A, the upper end of which is pivotally attached to a bent over ear 559 of a slide plate 560 which is supported and guided for vertical movement on the bracket 547 by pin and slot connections 561. The slide 560 is formed with a centrally located slot 562 through which passes the shaft 545. The slide is further formed with a pair of opposed arms 563 and 564, which cooperate with a pair of pins 565 and 566 fast on a rock lever 567 mounted on shaft 545.

It will thus be apparent that the rocking of the shaft 293 clockwise (Fig. 46) will lower the plate 560. The arm 564 will rock the lever 567 clockwise (Fig. 45) until the pin 566 contacts the arm 563 of the slide 560. The amount of movement thus imparted to the shaft 545 is sufficient to position the ink-wicks 544 and 552 so that they will be free of the edges of the card.

General operation

In starting the machine from a normal position, the card magazine 59 is loaded with a stack of cards to be verified. The trip key 380 is operated, thereby closing the motor circuit and starting the motor 110. The operation of the trip key also clutches the drive gears 424 and 436 to the main shaft 115, thereby rotating the cam shaft 151.

Figure 48:
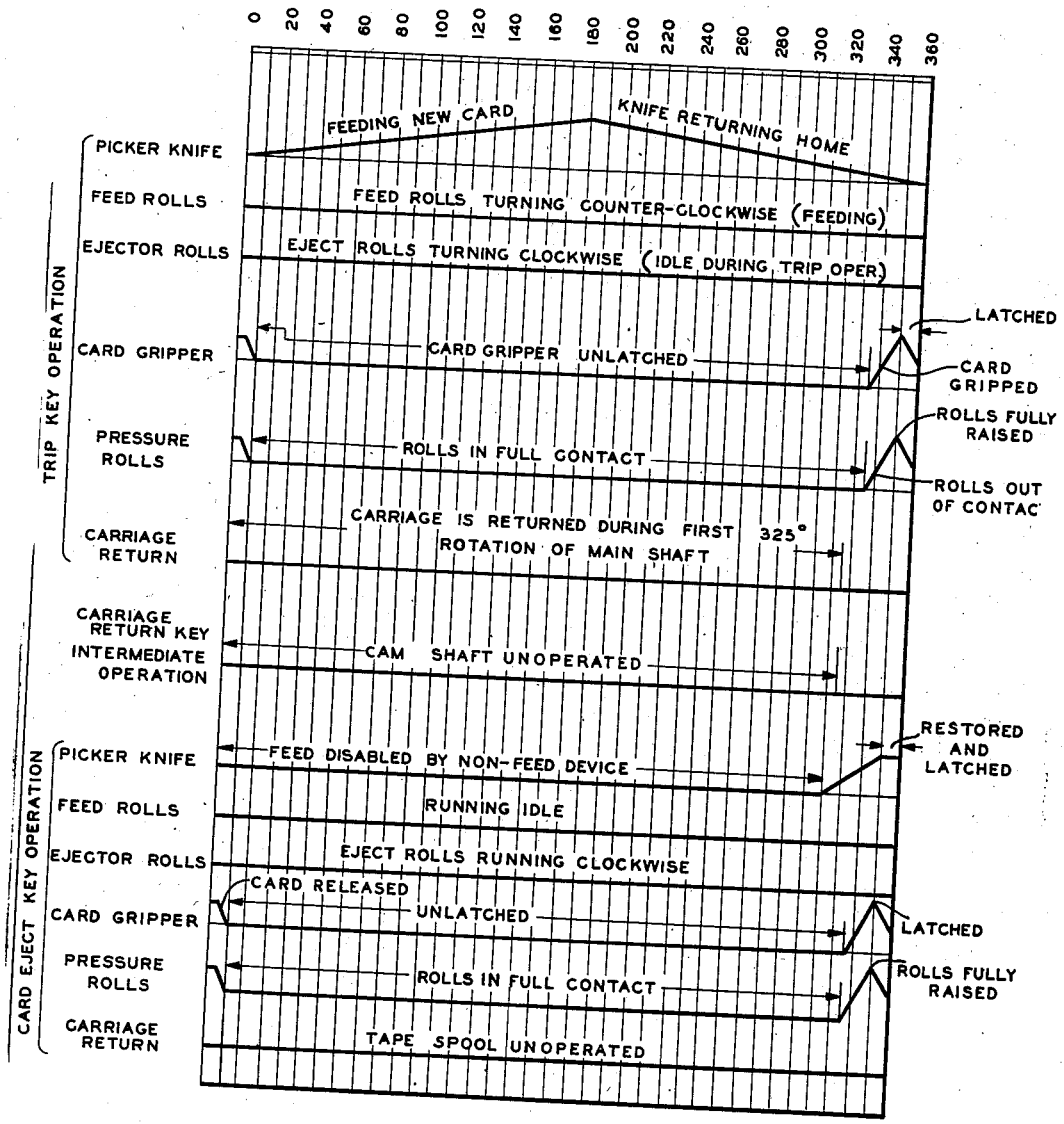
Fig. 48 is a timing chart for the operation of the machine.

Referring to Fig. 48 it will be seen that at 0° of the rotation of the cam shaft, the picker knife 155 engages the bottom card of the stack and feeds it toward the card feed rolls 156 which are at this time being rotated counter-clockwise by the cam shaft 151. Simultaneously, the drum pins adapted to sense the presence and absence of perforations in the upper and lower half of a card carried on said carriage, means for selectively marking the edges of the card, said means comprising two ink wicks fed by ink reservoirs and adapted to be resiliently held against the upper and lower edges of said card, and means for disengaging the wick from the lower edge of the card while the upper half of the card is being sensed, and for disengaging the wick from the upper edge of the card while the lower half is being sensed.

7. In a machine of the class described, a movable card carriage, means for sensing the absence and presence of perforations in the upper and lower zone of a card carried on said carriage, means for selectively marking the edges of said card comprising two ink wicks adapted to engage the upper and lower edge of the card, and means under control of said sensing means for disabling said marking means when said sensing means sense an incorrect perforation.

8. In a machine for verifying a record card having columns of perforations in a plurality of codes, means for sensing the coded perforations in each column of said card, a plurality of keys, a shaft, a translator connecting said keys and said sensing means, said translator comprising a frame fixed to said shaft and having two pairs of plates thereon, one of said pairs of plates supporting a plurality of elements for causing the card to be sensed in one code and the other supporting a plurality of elements for causing the card to be sensed in another code, and means for rocking said shaft for interposing either of said sets of elements between said keys and said sensing means.

9. In a machine for verifying a record card having columns of perforations in a plurality of codes, means for sensing the coded perforations in each column of said card, a plurality of keys, a shaft, a frame fixed to said shaft, means for connecting said keys and said sensing means, said connecting means comprising two sets of elements supported by said frame, one for permitting the card to be sensed in one code and the other for permitting the card to be sensed in another code, and means for rocking said shaft to selectively vary the connections between said keys and said sensing means.

10. In a machine of the class described, a column of sensing pins, a pair of bail members each cooperating with portions of said column of sensing pins for the release of part only of said pins to sense perforations in a card column, and means for coupling said pair of bails for the release of all of said sensing pins to sense an entire column.

11. In a machine of the class described, means including a column of sensing pins for sensing coded perforations in the upper and lower zones of a record card, a bail adapted when rocked to release a portion only of said column of sensing pins for sensing perforations in the upper zone of said card, a second bail adapted when rocked to release another portion of said column of sensing pins for sensing perforations in the lower zone of said card, and means for coupling said first and second mentioned bails for releasing the entire column of sensing pins to sense perforations in both zones of the card.

12. In a machine of the class described, a pair of sets of normally ineffective pins for sensing each column of a record card, a bail for each set of pins adapted when rocked to render its associated set of pins effective, a plurality of keys, means operable upon the depression of any of said keys for rocking one of said bails, and means for coupling said bails to cause the rocking of both of said bails when any one of said keys is depressed.

13. In a machine of the class described, a column of sensing pins, separate means cooperating with portions of said column of sensing pins for the release of part only of said pins to sense perforations in one code, and means for coupling said separate means for the release of all of said sensing pins to sense perforations in another code.

14. In a machine of the class described, a column of sensing pins, a pair of bail members each cooperating with portions of said column of sensing pins for the release of part only of said pins to sense perforations in a card column, a plurality of keys equal in number to said sensing pins, and means settable in one position for rendering one of said pair of bails effective upon operation of any one of said keys and settable in another position for rendering the other of said pair of bails effective upon operation of any one of said keys.

15. In a machine of the class described, means for sensing columns of perforations in a record card, means for mutilating said card, a key operable mechanism, means under control of said sensing means for coupling said key operable mechanism and said mutilating mechanism upon the sensing of an incorrect perforation, and means whereby said key operable mechanism and said mutilating means are held in coupled relation until the operation of said key operable mechanism.

16. In a machine of the class described, a movable carriage adapted to support a record card, means including a single row of sensing pins for sensing the presence and absence of perforations in said card, an escapement mechanism for said carriage adapted to position successive columns of said card over said row of sensing pins, means for alternatively marking the upper and lower edges of said card while the card is carried by said carriage over said sensing pins, and means under control of said sensing means for rendering said marking means ineffective when said sensing means sense an incorrect perforation.

17. In a machine of the class described, a movable card carriage; means for sensing a card carried on said carriage; means for alternatively marking the edges of said card, said means comprising two ink containers, each with a wick, one end of each wick held within said containers and the other ends adapted to be resiliently held against the upper and lower edges of said card; and means under control of said sensing means for concomitantly rendering both of said wicks ineffective when said sensing means sense an incorrect perforation.

18. In a machine of the class described; a movable card carriage; a single column of sensing pins adapted to sense the presence and absence of perforations in the upper and lower path of the card carried on said carriage; means for selectively marking the edges of the card, said means comprising two ink wicks fed by ink reservoirs and adapted to be resiliently held against the upper and lower edges of said card; means for disengaging the wick from the lower edge of the card while the upper half of the card is being sensed and for disengaging the wick from the upper edge of the card while the lower half is 412 is clutched to the main drive shaft 115, thereby causing the card carriage to move to the right. At 180° the card leaves the picker knife and enters the feed rolls, which carry it into contact with the card stop 144. At 325° of the rotation of the main shaft, the carriage has brought the card gripper into a position over the left-hand edge of the card, and at 335° the cam 450 rocks the shaft 191 rotating the arm 198 thereby closing the jaws of the gripper on the card, the card being fully gripped at 340°. Further rotation of the arm 198 latches the gripper closed at 350°.

At this point the card is now in condition to be verified and it is necessary to condition the keyboard in accordance with the type of code used in the card. If 45-column cards are to be verified, the handle 181 is drawn toward the front of the machine, thereby setting the translating mechanism for 45-column work. If, however, 90-column cards are to be verified, it is the usual practice to sense the upper zone of the card first. Therefore, the "upper" key 48 is depressed, positioning the translating mechanism for upper zone verification. The numeral keys corresponding to the data contained in the upper portion of the card are now operated. The operation of the numeral keys steps the card carriage to the left, column by column, under control of the escapement mechanism until an error is found, until the whole, or a zone of the card has been verified. If an error is found, the carriage is released and travels to the left to the eject position automatically, and if after all the 45 columns have been verified, the carriage is released automatically as described above, and carries the card into contact with the bell-crank 366 which operates the key interlock slide 357, thereby permitting either the operation of the "carriage return" key 470 or "eject" keys 475 and preventing the reoperation of the "trip" key 388. After the upper zone of a 90-column card has been verified, and it is desired to verify the lower zone. the "carriage return" key is operated, at this time, to return the card to the right to permit the verification of the lower zone. Before this can be done, the "lower" key 49 must be depressed to condition the translating mechanism.

After the verifying of the lower zone has been completed, the card is moved to a position in which it again contacts the bell-crank 366, thereby again permitting the operation of either the "carriage return" or "eject" key. At this point, the "eject" key is operated, unlatching the disabling pin 499, thereby raising the cards out of the path of the card picker 155, thus preventing feeding of another card into the sensing position. Immediately afterward, the "eject" key will cause the contacts to close, again starting the motor, and clutching the gears 424 and 436 to the main shaft 115, thereby again rotating the cam shaft 151. The feed rolls are operated as before, but due to no card being fed from the card magazine the feed rolls run idle at this time. At about 320° of the rotation of the cam shaft 151, the cam 499 will lower the pin 490 into the position in which it may be latched at about 350° of the cycle by the latch 501.

The rotation of the shaft 191 by the cam 450 causes the card gripper to be unlatched and drops the pressure rolls 167 into contact with the card, thereby making eject rolls 165 effective to eject the card from the machine into either the error pocket 169 or the storage pocket 168. The eject rolls 165 were continuously rotated by the cam shaft 151. At 335°, the shaft 191 is again rotated by cam 450 to cause the pressure rolls 167 to be raised and the card gripper to be again latched. The card gripper, at this time, however. is ineffective, due to the fact that the card has already been ejected from the machine. During this operation, the tape spool 412 is not operated, because the "eject" key does not actuate the clutch for operating this spool.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, a movable carriage adapted to support a record card, means including a single row of sensing pins for sensing the presence and absence of perforations in said card, an escapement mechanism for said carriage adapted to position successive columns of said card over said row of sensing pins, and means for alternatively marking the upper and lower edges of said card while the card is carried by said carriage over said sensing pins.

2. In a machine of the class described, a movable carriage adapted to support a record card, means for sensing the presence and absence of perforations in said card, an escapement mechanism for said carriage for positioning successive columns of said card over said sensing means, means for marking said card during the movement of said carriage from one columnar position to the next, and means under control of said sensing means for rendering said marking means ineffective when said sensing means sense an incorrect perforation.

3. In a machine of the class described, a movable carriage adapted to support a record card, means including a single row of sensing pins for sensing the presence and absence of perforations in said card, an escapement mechanism for said carriage adapted to position successive columns of said card over said row of sensing pins, means for marking an edge of said card during the movement of said carriage from one columnar position to the next, and means under control of said sensing pins for rendering said marking means ineffective when said sensing pins sense an incorrect perforation.

4. In a machine of the class described, a movable card carriage, means for sensing a card carried on said carriage, means for alternatively marking the edges of said card, said means comprising two ink containers, each with a wick, one end of each wick held within said containers and another end portion thereof adapted to be resiliently held against the edges of said card.

5. In a machine of the class described, a movable card carriage, means for sensing a card carried on said carriage, means for alternatively marking the edges of said card, said means comprising two ink containers, each with a wick, one end of each wick held within said containers and the other ends adapted to be resiliently held against the upper and lower edges of said card.

6. In a machine of the class described, a movable card carriage, a single column of sensing being sensed; and means under control of said sensing pins for disabling said marking means when said sensing pins sense an incorrect perforation whereby both of said wicks are disengaged from the edges of the card.

19. In a machine of the class described, means for sensing columns of perforations in a record card, means for mutilating said card, a key operable mechanism, means under control of said sensing means for coupling said key operable mechanism and said mutilating means upon the sensing of an incorrect perforation, and additional means under control of said sensing means for retaining said key operable mechanism and said mutilating means in coupled relation.

20. In a machine of the class described, means for sensing columns of perforations in a record card, means for mutilating said card, a key operable mechanism, means under control of said sensing means for coupling said key operable mechanism and said mutilating means upon the sensing of an incorrect perforation, and additional means under control of said sensing means for retaining said key operable mechanism and said mutilating means in coupled relation, said retaining means being adapted to be rendered ineffective upon the operation of said key operable mechanism whereby said key operable mechanism and said mutilating means may be uncoupled.

ROBERT W. RITZERT.